(12) United States Patent
Kim

(10) Patent No.: US 10,075,633 B2
(45) Date of Patent: Sep. 11, 2018

(54) CAMERA MODULE AND METHOD OF MANUFACTURING THE SAME

(71) Applicant: Samsung Electro-Mechanics Co., Ltd., Suwon-si (KR)

(72) Inventor: Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 79 days.

(21) Appl. No.: 15/199,405

(22) Filed: Jun. 30, 2016

(65) Prior Publication Data

US 2017/0104926 A1    Apr. 13, 2017

(30) Foreign Application Priority Data

Oct. 13, 2015 (KR) .................. 10-2015-0143093
Nov. 30, 2015 (KR) .................. 10-2015-0169517

(51) Int. Cl.
| | |
|---|---|
| *H04N 5/232* | (2006.01) |
| *H04N 5/357* | (2011.01) |
| *H04N 5/76* | (2006.01) |
| *H04N 5/225* | (2006.01) |
| *H04N 17/00* | (2006.01) |

(52) U.S. Cl.
CPC ....... *H04N 5/23235* (2013.01); *H04N 5/2257* (2013.01); *H04N 5/3572* (2013.01); *H04N 5/76* (2013.01); *H04N 17/002* (2013.01)

(58) Field of Classification Search
CPC ............ H04N 5/23235; H04N 5/2257; H04N 5/3572; H04N 5/76
See application file for complete search history.

(56) References Cited

U.S. PATENT DOCUMENTS

| | | | | |
|---|---|---|---|---|
| 7,639,888 | B2 * | 12/2009 | Steinberg | ........... H04N 5/23212 348/208.99 |
| 9,405,119 | B2 * | 8/2016 | Klapp | ................ G02B 26/06 |
| 2009/0002574 | A1 | 1/2009 | Sorek et al. | |
| 2014/0160005 | A1 | 6/2014 | Lee et al. | |
| 2014/0219050 | A1 | 8/2014 | Park et al. | |

FOREIGN PATENT DOCUMENTS

| | | |
|---|---|---|
| JP | 2009-260622 A | 11/2009 |
| KR | 10-2009-0004428 A | 1/2009 |
| KR | 10-2009-0041993 A | 4/2009 |
| KR | 10-2014-0076413 A | 6/2014 |
| KR | 10-2014-0100669 A | 8/2014 |

* cited by examiner

*Primary Examiner* — Twyler Haskins
*Assistant Examiner* — Fayez Bhuiyan
(74) *Attorney, Agent, or Firm* — NSIP Law

(57) ABSTRACT

A camera module having an image sensor and an optical system having at least one lens includes a memory storing information regarding aberration characteristics of the camera module affecting a resolution of the camera module, and the information regarding aberration characteristics comprises information estimated in advance by comparing an image generated by the camera module with a reference image.

16 Claims, 18 Drawing Sheets

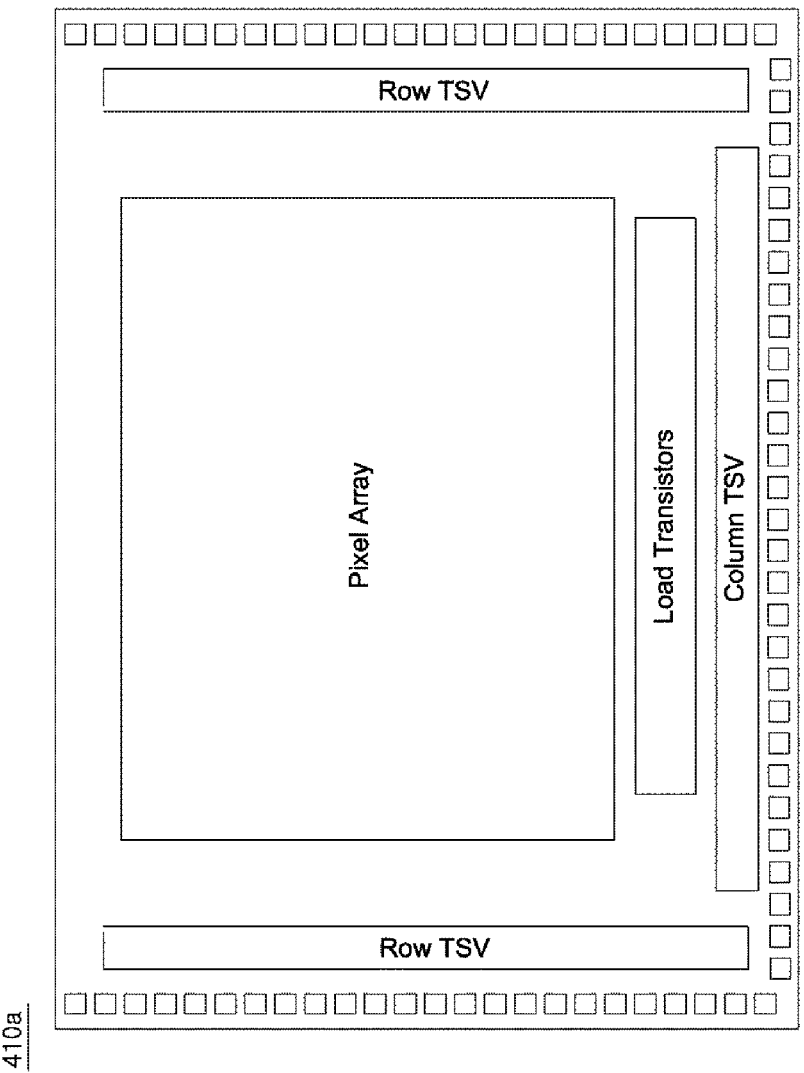

CAMERA MODULE AND METHOD OF MANUFACTURING THE SAME

CROSS-REFERENCE TO RELATED APPLICATIONS

This application claims the benefit under 35 USC 119(a) of Korean Patent Application Nos. 10-2015-0143093 filed on Oct. 13, 2015, and 10-2015-0169517 filed on Nov. 30, 2015, in the Korean Intellectual Property Office, the entire disclosures of which are incorporated herein by reference for all purposes.

BACKGROUND

1. Field

This application relates to a camera module and a method of manufacturing the same.

2. Description of Related Art

In general, there is consumer demand for improvements in the low light level image quality performance of camera modules used in mobile devices. However, the two greatest mechanical restrictions of a reduction in size of image pixels and a reduction in a camera module height make it difficult to achieve a high image quality such as a high-definition resolution.

This is because the resolution of a peripheral portion of a camera module is more sensitive to shape dispersion of plastic lenses manufactured through injection molding due to a reduction in size of image pixels and assembly tilting and decentering of several lenses constituting a lens of the camera module.

In addition, in a high-resolution auto-focusing camera module, the resolution of a peripheral portion tends to be more sensitive to a package tilt that occurs in the process of mounting a lens-actuator assembly on a printed circuit board (PCB). Such tilting and decentering deteriorate the resolution of the peripheral portion of the camera module, which leads to a decrease in a resolution yield of the camera module.

Generally, in a lens injection molding system for mass producing lenses, even though lenses are injection molded from the same mold, surface shapes of the lenses tend to have a distribution varying from a design value due to cavities.

As a result, a shape dispersion of the lenses tends to be further increased, and when several lenses are assembled, decentering occurs among the lenses, making it difficult to assemble the lenses in a desired configuration without a tilt.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module having an image sensor and an optical system having at least one lens includes a memory storing information regarding aberration characteristics of the camera module affecting a resolution of the camera module; and the information regarding aberration characteristics includes information estimated in advance by comparing an image generated by the camera module with a reference image.

The information regarding aberration characteristics may include data expressing an image blur generated when light passing through the optical system forms an image on the image sensor.

The information regarding aberration characteristics may include aberration information of a plurality of regions of the image estimated according to different schemes.

The aberration information may include aberration information of some regions of the plurality of regions of the image estimated according to a first scheme, and aberration information of remaining regions of the plurality of regions of the image estimated according to a second scheme; and a total data size of the aberration information estimated according to the first scheme and a total data size of the aberration information estimated according to the second scheme are different from each other.

The aberration information estimated according to the first scheme may include point spread function data expressing an image blur generated when light passing through the optical system forms an image on the image sensor.

The aberration information estimated according to the second scheme may include blur parameters including a peak coordinate position and a blur width extracted from point spread function data expressing an image blur generated when light passing through the optical system forms an image on the image sensor.

The information regarding aberration characteristics may include information regarding an amount of distortion of the image captured by the camera module.

The memory may further store a parameter determining a degree of improvement of resolution of the image captured by the camera module according to either one or both of an illumination environment and a focus position when the image is captured.

The camera module may further include a signal processor configured to improve a resolution of an image captured by the camera module using the information regarding aberration characteristics.

In the camera module, TTL/IMGH<1 may be satisfied, where TTL is a distance from an object side surface of a lens of the optical system closest to a subject to an image formation surface of the image sensor, and IMGH is a diagonal length of a pixel array of the image sensor.

In the camera module, TTL/IMGH≤0.75 or TTL/IMGH≤0.7 may be satisfied.

The information regarding aberration characteristics may include information estimated according to individual characteristics of the camera module during a process of manufacturing the camera module.

In another general aspect, a camera module for generating an image with an image sensor and an optical system having at least one lens includes a memory storing at least two types of information regarding aberration characteristics of the camera module affecting a resolution of the image.

In another general aspect, a camera module includes an optical system including at least one lens; an image sensor configured to generate an image in response to receiving light passing through the optical system; a memory storing information regarding aberration characteristics of the optical system and the image sensor, the information regarding aberration characteristics including data indicating a degree to which the image is blurred; and a signal processor configured to perform image processing of the image to improve a resolution of the image using the information regarding aberration characteristics, and provide the processed image to an external electronic device.

In another general aspect, a camera module for generating an image with an image sensor and an optical system having at least one lens includes a memory storing information regarding aberration characteristics of the optical system and the image sensor, the information regarding aberration characteristics including data indicating a degree to which the image is blurred; and the camera module is configured to provide the image generated by the optical system and the image sensor and the information regarding aberration characteristics to an external electronic device.

In another general aspect, a method of manufacturing a camera module for generating an image with an image sensor and an optical system having at least one lens includes estimating information regarding aberration characteristics of an image generated by an individual camera module; and storing the estimated information in a memory of the individual camera module.

In another general aspect, a camera module includes an image sensor; an optical system configured to form an image on the image sensor; and a memory storing information for correcting a resolution of the camera module, the information being specific to the camera module and having been customized for the camera module during manufacture of the camera module.

The information for correcting the resolution may include a first type of information for first regions of the image sensor in which the resolution of the camera module is lower than a predetermined threshold value; and a second type of information for second regions of the image sensor in which the resolution of the camera module is higher than the predetermined threshold value.

The first type of information may include point spread function data estimated for the first regions of the image sensor; and the second type of information may include blur parameters estimated from a function approximating point spread function data estimated for the second regions of the image sensor.

The memory further stores information for correcting a distortion of an image generated by the image sensor caused by an optical distortion of the optical system.

Other features and aspects will be apparent from the following detailed description, the drawings, and the claims.

BRIEF DESCRIPTION OF DRAWINGS

FIGS. 14 through 15B are views illustrating examples of a configuration of an image sensor in the camera module of FIG. 13.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
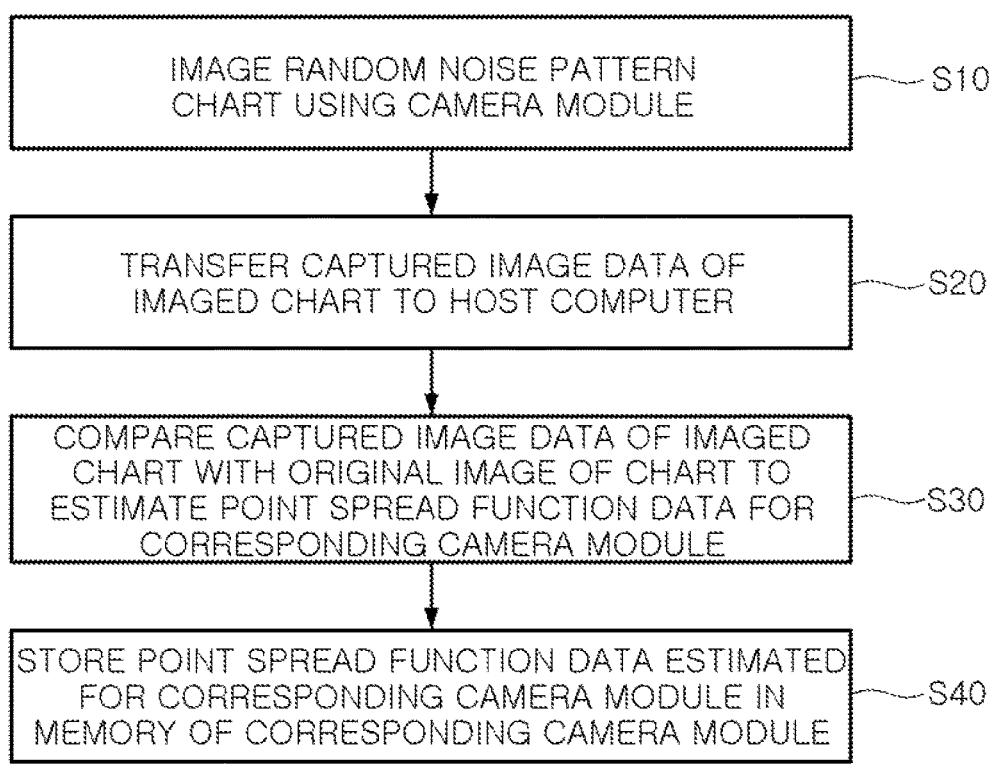
FIG. 1 is a flow chart illustrating an example of a process in which information regarding aberration characteristics customized for each camera module is stored in each camera module in a process of manufacturing camera modules.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, when an element, such as a layer, region, or wafer (substrate), is described as being "on," "connected to," or "coupled to" another element, it can be directly "on," "connected to," or "coupled to" the other element, or there may be other elements intervening therebetween. In contrast, when an element is referred to as being "directly on," "directly connected to," or "directly coupled to" another element, there can be no other elements or layers intervening therebetween. As used herein, the term "and/or" includes any and all combinations of one or more of the associated listed items.

Although terms such as "first," "second," and "third" may be used herein to describe various members, components, regions, layers, and/or sections, these members, components, regions, layers, and/or sections are not to be limited by these terms. Rather, these terms are only used to distinguish one member, component, region, layer, or section from another member, component, region, layer, or section. Thus, a first member, component, region, layer, or section referred to in an example below could also be termed a second member, component, region, layer, or section without departing from the teachings of the example.

Spatially relative terms, such as "above," "upper," "below," and "lower," may be used herein for ease of description to describe one element's relationship to another element as shown in the figures. Such spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements. Thus, the term "above" can encompass both the above and below orientations depending on a particular direction of the figures. The device may be otherwise oriented (rotated 90 degrees or at other orientations), and the spatially relative terms used herein are to be interpreted accordingly.

The terminology used herein is for describing particular examples only, and is not intended to limit the disclosure. The terms "a," "an," and "the" include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations if the shapes shown in the drawings may occur. Thus, the examples described below are not to be construed as being limited to the particular shapes of regions shown in the drawings, but include changes in shape occurring during manufacturing.

In general, a camera module has an optical system including at least one lens. An image obtained by a camera module is different from an actual image because the resolution of the camera module is affected by aberration of the optical system.

Aberration is a phenomenon in which light rays that have passed through an optical system do not focus at the same point so an image appears blurred, colored, or distorted.

Aberration includes monochromatic aberration occurring when monochromatic light having a predetermined wavelength is used, and chromatic aberration occurring when refractive indices of an optical system are different for different wavelengths of light.

Monochromatic aberration includes tilt, defocus, spherical aberration, coma aberration, astigmatism, curvature of field, and distortion.

In this application, the term "aberration" means either one or both of monochromatic aberration and chromatic aberration.

In general, as camera modules used in portable electronic devices become thinner, aberration tends to increase, and the increase in aberration reduces the resolution of the camera modules.

The examples describe below provide a camera module having a reduced thickness and a high-definition resolution by performing a process of correcting the resolution of the camera module.

For example, the examples described below provide a camera module having a correction algorithm for correcting resolution and a method of manufacturing the same.

Figure 2:
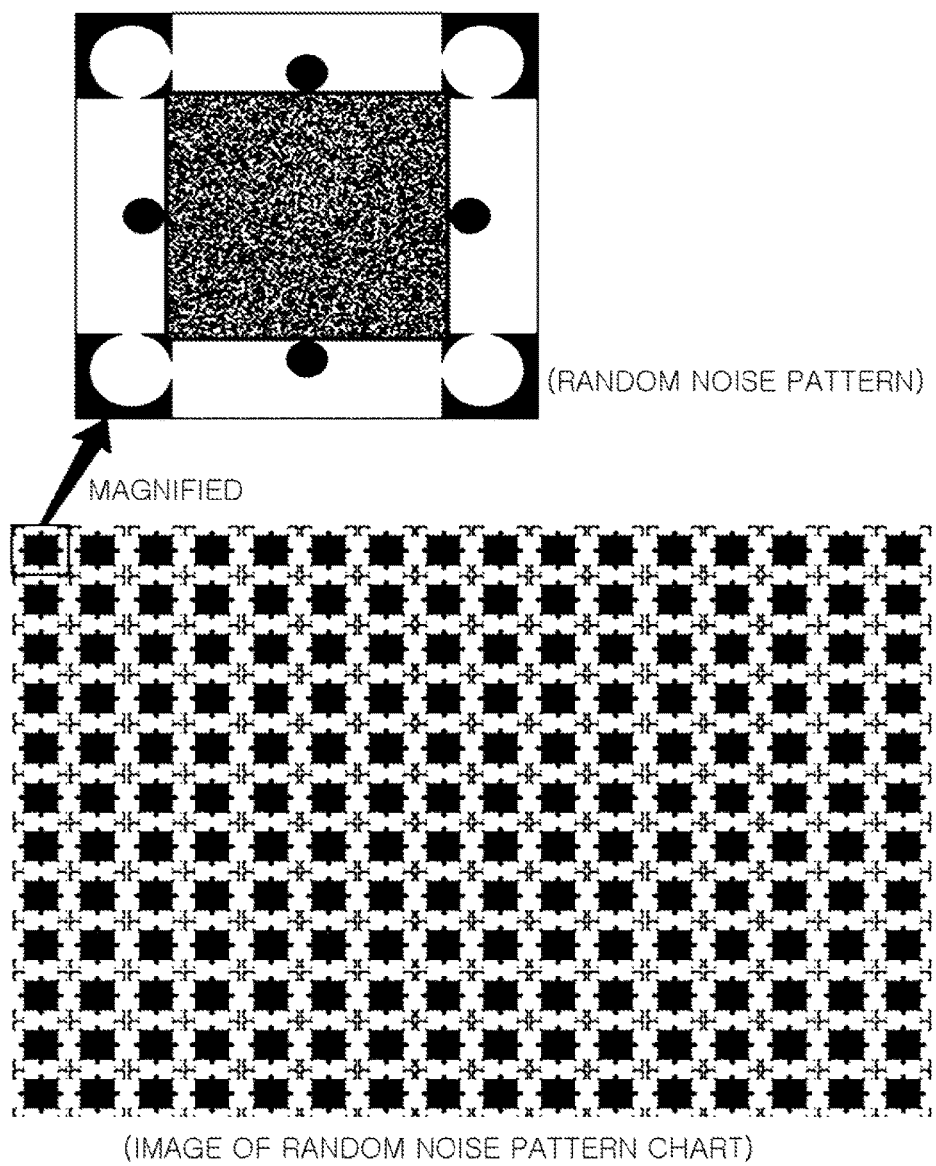
FIG. 2 is a view illustrating an example of a random noise pattern chart for estimating a point spread function (PSF).

FIG. 1 is a flow chart illustrating an example of a process in which information regarding aberration characteristics customized for each camera module is stored in each camera module in a process of manufacturing camera modules, and FIG. 2 is a view illustrating an example of a random noise pattern chart for estimating a point spread function (PSF).

A blurred image formed when a subject is imaged by a camera module may be expressed by the following Equation 1.

$$\text{Blur\_Image} = \text{PSF} * \text{Clear\_Image} \tag{1}$$

In Equation 1, the symbol * denotes a convolution operation.

In general, an image obtained by a camera module is blurred when a subject imaged by the camera module is out of focus. Such blur is intensified as camera modules are reduced in size.

Blurring is a phenomenon in which a brightness of a pixel of an original image distorts a brightness of an adjacent pixel due to aberration. This phenomenon may be expressed as a point spread function (PSF) indicating a degree of blur.

The PSF is a value expressing a blurred image that occurs during a process in which an optical system forms an image of a subject on an image sensor.

The PSF is directly related to the resolution of a camera module. For example, when PSF data has a relatively narrow distribution, the PSF data may be expressed with a high resolution, and conversely, when the PSF data has a relatively large distribution, the PSF data may be expressed with a low resolution.

A blurred image may be modeled by convolving an original image and a PSF. Thus, when a PSF is known, the original image may be restored from the blurred image by deconvolving the blurred image. However, it is not easy to accurately know the PSF of the blurred image, and thus a process of estimating a PSF is required.

A process in which information regarding aberration characteristics customized for each camera module is stored in each camera module during a process of manufacturing camera modules will be described with reference to FIG. 1.

The chart illustrated in FIG. 2 is a random noise pattern chart for estimating a PSF.

First, the random noise pattern chart is positioned at a specific distance from a camera module. For example, the random noise pattern chart is positioned at a position 1.2 meters away from the camera module.

The random noise pattern chart is imaged using the camera module in operation S10, and captured image data (i.e., raw imaging data) of the imaged random noise pattern chart is transferred to a host computer (a host PC) in operation S20. The image of the random noise pattern chart captured by the camera module is a blurred image.

The host computer compares the captured image data with an original image of the random noise pattern chart to estimate a PSF in operation S30.

The estimated PSF is stored in a memory of the camera module in operation S40 for use in restoring the original image from the blurred image captured by the camera module.

Through this process, the camera module obtains information regarding the estimated PSF for use in correcting the resolution of the captured image to achieve a high-definition resolution.

The PSF data has a shape similar to a Gaussian function in a central region of a pixel array of an image sensor of the camera module, and a shape that diverges from the Gaussian function in a peripheral region of the pixel array.

Thus, to effectively estimate the PSF data having different shapes by regions of the pixel array of the image sensor, the pixel array of the image sensor is divided into M equal parts in a horizontal direction and N equal parts in a vertical direction, and the PSF data is estimated for a total of M×N window regions.

In one example, captured image data is divided into several regions, PSF data of each of the regions is estimated, a difference between the estimated PSF data of each of the regions and a design value of the optical system is determined, and the estimated PSF data of a region significantly different from the design value is stored in the memory of the camera module.

A region whose PSF data is not significantly different from the design value is a region having a desirable resolution, and thus the estimated PSF data of the corresponding region is not stored as is, but is approximated by a Gaussian function to estimate blur widths and a peak coordinate position, and blur parameters including the blur widths and the peak coordinate position are stored in the memory of the camera module.

Figure 3:
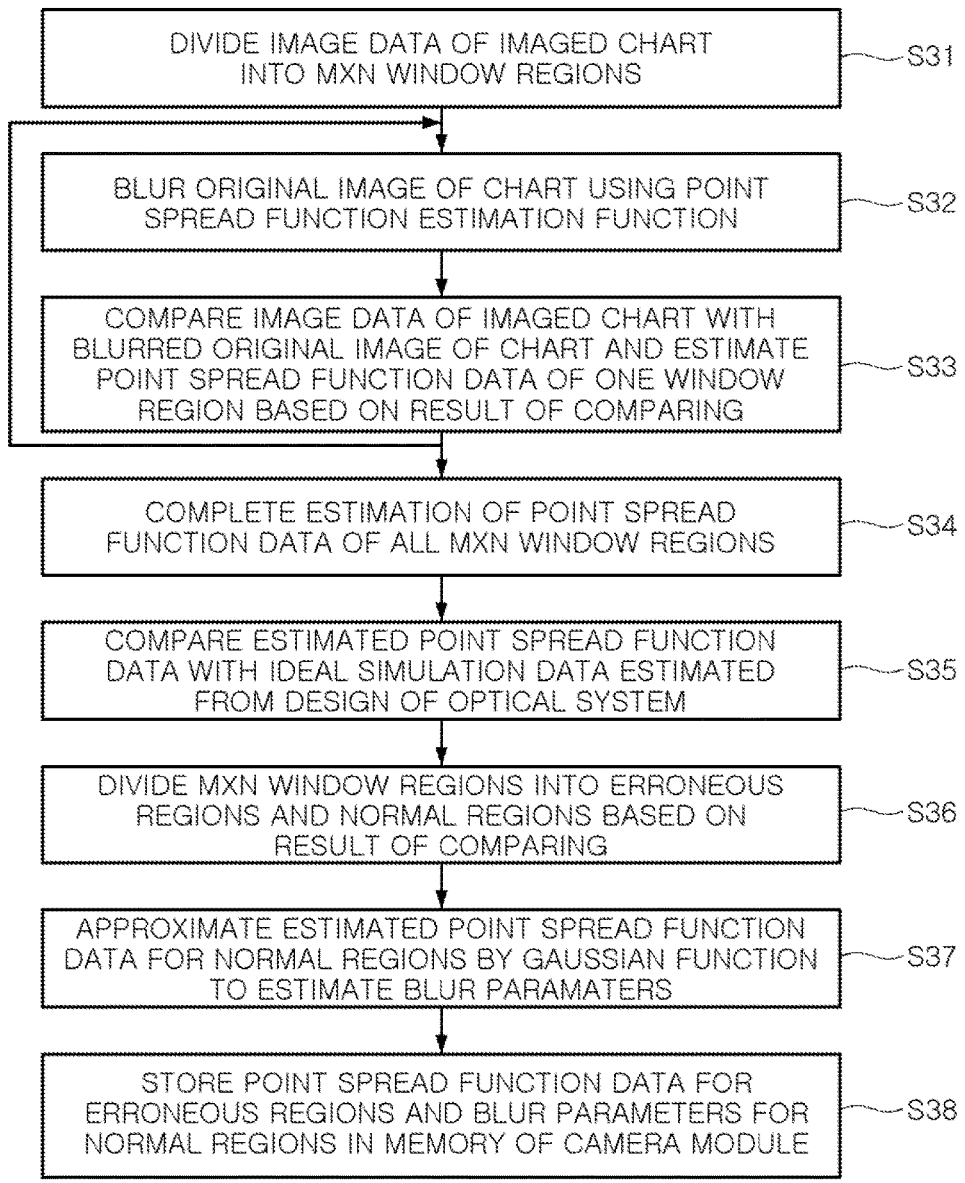
FIG. 3 is a flow chart illustrating an example of a method of estimating information regarding aberration characteristics for window regions of an image.

FIG. 3 is a flow chart of an example of a method of estimating information regarding aberration characteristics for window regions of an image.

First, image data of an imaged chart is divided into M×N window regions in operation S31

Next, the image data of the imaged chart is compared with the original image of the chart for each of the window regions.

The original image of the chart is blurred using a PSF estimation function in operation S32, and the image data of the imaged chart is compared with the blurred original image of the chart in operation S33. PSF data of one window region is estimated by minimizing a difference between the blurred original image of the chart and the image data of the imaged chart by changing the PSF estimation function until a minimum difference is obtained. Operations S32 and S33 are repeated for each of the M×N window regions.

When the estimation of PSF data of all of the M×N of window regions is completed in operation S34, the estimated PSF data of each of the window regions is compared with ideal simulation data estimated from a design of the optical system in operation S35. Alternatively, the estimated PSF data of each of the window regions may be compared with actually estimated PSF data of a representative camera module.

When a difference value between the estimated PSF data of a window region and the ideal simulation data is greater than a specific threshold value, the corresponding window region is determined to be an erroneous region (no-good or NG region) in terms of resolution of the camera module in operation S36. Thus, the erroneous region (NG region) may be considered to be a region in which the resolution of the camera module is less than a predetermined threshold value.

Conversely, when the difference value is smaller than the specific threshold value, the estimated PSF data of the corresponding window region is not significantly different from the ideal simulation data, and thus the corresponding window region is determined to be a normal region (OK region) in terms of resolution of the camera module in operation S36. Thus, the normal region (OK region) may be considered to be a region in which the resolution of the camera module is greater than a predetermined threshold value.

Aberration information of the erroneous regions (NG regions) and aberration information of the normal regions (OK regions) are estimated according to different schemes.

For example, for the erroneous regions (NG regions), aberration information is estimated according to a first scheme and stored in the memory of the camera module, and for the normal region (OK regions), aberration information is estimated according to a second scheme and stored in the memory of the camera module.

The first and second schemes will hereinafter be described in detail.

The PSF data estimated for the erroneous regions (NG regions) is used as is, and the PSF data estimated for the normal regions (OK regions) is not used as is, but is approximated by a Gaussian function to estimate blur parameters including blur widths and a peak coordinate position in operation S37. The PSF data estimated for the erroneous regions (NG regions) and the blur parameters estimated for the normal (OK) regions are stored in the memory of the camera module in operation S38.

For example, Equation 2 below expresses a Gaussian approximation function used in a PSF approximation estimation process performed for the normal regions (OK regions).

The PSF data values estimated in the previous stage undergo a normalization process so that a maximum value thereof is 255 (a maximum value in an 8-bit gray scale), and approximation estimation may subsequently be performed thereon using the Gaussian approximation function expressed by Equation 2 below.

$$PSF_{gaussian}(x, y) = 255 * \exp\left(-\left[\left(\frac{x-a}{\sigma_x}\right)^2 + \left(\frac{y-b}{\sigma_y}\right)^2\right]\right) \quad (2)$$

In Equation 2, blur parameters a and b denote coordinate positions of a peak of the divided window regions in horizontal and vertical directions, respectively, and blur parameters $\sigma_x$ and $\sigma_y$ denote blur widths of the divided window regions in horizontal and vertical directions, respectively. Values of the blur parameters may be obtained using a curve fitting technique using the Gaussian approximation function expressed by Equation 2.

As described above, for the erroneous regions (NG regions), the estimated PSF data is sequentially stored as is in the memory of the camera module, while for the normal regions (OK regions), the estimated PSF data is not stored as is, but blur parameters including the peak coordinate position (a, b) and the blur widths ($\sigma_x$ and $\sigma_y$) that approximate the estimated PSF data by the Gaussian function are stored in the memory of the camera module in operation S38. Thus, a size of the data stored in the memory may be significantly reduced.

Estimating the PSF data is the first scheme, and approximating the estimated PSF data to generate the blur parameters is the second scheme.

Thus, for the erroneous regions (NG regions), the information obtained using the first scheme is stored in the memory of the camera module, and for the normal regions (OK regions), the information obtained using the second scheme is stored in the memory of the camera module.

A total data size of the aberration information estimated according to the first scheme and a total data size of the aberration information estimated according to the second scheme are different.

For example, when it is assumed that an image is divided into 16×12 window regions to estimate PSF data and the estimated PSF data is entirely stored in the memory, a required size of the memory is as described in [Case 1] and [Case 2] below.

In the case in which the entire image is divided into 16×12 window regions, the number of regions present within 0.3 field is 6×6=36, and the number of regions present within 0.5 field is 10×10=100.

When a diagonal of a pixel array of an image sensor is expressed as 1.0 field, a pixel array of an image sensor having a 4:3 aspect ratio may be expressed as 0.8 field in a horizontal direction and 0.6 field in a vertical direction.

[Case 1] It is assumed that the number of required channels is 4 channels of R, Gr, Gb, and B.

The number of required channels×the number of regions×the size of the PSF data of each region×the resolution of the PSF data.

① 0.0-0.3 field: It is assumed that the size of the PSF data is 5×5 pixels=4× (6×6)×(5×5)×1 byte=3,600 bytes.

② 0.3-0.5 field: It is assumed that the size of the PSF data is 7×7 pixels=4×(10×10-6×6)×(7×7)×1 byte=12,544 bytes.

③ 0.5-1.0 field: It is assumed that the size of the PSF data is 9×9 pixels=4×(16×12-10×10)×(9×9)×1 byte=29,808 bytes.

Thus, the overall size of the required memory is 3,600+12,544+29,808=45,952 bytes=44.88 Kbytes (1 Kbyte=1024 bytes).

[Case 2] It is assumed that the number of required channels is 3 channels of R, G, and B (the same PSF is applied to Gr and Gb channels).

The number of required channels×the number of regions×the size of the PSF data of each region×the resolution of the PSF data.

① 0.0-0.3 field: It is assumed that the size of the PSF data is 5×5 pixels=3×(6×6)×(5×5)×1 byte=2,700 bytes.

② 0.3-0.5 field: It is assumed that the size of the PSF data is 7×7 pixels=3×(10×10-6×6)×(7×7)×1 byte=9,408 bytes.

③ 0.5-1.0 field: It is assumed that the size of the PSF data is 9×9 pixels=3×(16×12-10×10)×(9×9)×1 byte=22,356 bytes.

Thus, the overall size of the required memory is 2,700+9,408+22,356=34,464 bytes=33.66 Kbytes.

In contrast, when it is assumed that the estimated PSF data is stored as is only for the erroneous regions (NG regions) (the five regions having the greatest differences between the estimated PSF data and ideal simulation data estimated from a design of the optical system or actually estimated PSF data of a representative module), and the aforementioned blur parameters a, b, $\sigma_x$, and $\sigma_y$ obtained using a curve fitting technique using the Gaussian approximation function are stored for the other normal regions (OK regions), a size of a required memory is as described in [Case 3] and [Case 4] below.

It is assumed that the five erroneous regions (NG regions) occur in a region greater than 0.5 field, and that four blur parameters a, b, $\sigma_x$, and $\sigma_y$ set as a default in each region are used in an internal correction algorithm of a hardware block performing a correction calculation for a region within 0.5 field. Thus, the estimated PSF data is stored as is only for the five erroneous regions (NG regions) in the region greater than 0.5 field, and the blur parameters a, b, $\sigma_x$, and $\sigma_y$ obtained using a curve fitting technique using the Gaussian approximation function are stored only for the normal regions (OK regions) in the region greater than 0.5 field. It is assumed that each of the blur parameters is expressed as 1 byte.

[Case 3] It is assumed that the number of required channels is 4 channels of R, Gr, Gb, and B.

① The number of required channels×the number of erroneous regions (NG regions)×the size of the PSF data of each region×the resolution of the PSF data=4×(5)×(9×9)×1 byte=1,620 bytes.

② The number of the required channels×the number of normal regions (OK regions) in the region greater than 0.5 field×the blur parameters of each region=4×(16×12-10×10-5)×4 bytes=1,392 bytes.

Thus, the overall size of the required memory is 1,620+1,392=3,012 bytes=2.94 Kbytes.

[Case 4] It is assumed that the number of required channels is 3 channels of R, G, and B (the same PSF is applied to Gr and Gb channels).

① The number of the required channels×the number of erroneous regions (NG regions)×the size of the PSF data of each region×the resolution of the PSF data=3×(5)×(9×9)×1 byte=1,215 bytes.

② The number of the required channels×the number of normal regions (OK regions) in the region greater than 0.5 field×the blur parameters of each region=3×(16×12-10×10-5)×4 bytes=1,044 bytes.

Thus, the overall size of the required memory is 1,215+1,044=2,259 bytes=2.21 Kbytes.

In this manner, regions are divided into erroneous regions (NG regions) and normal regions (OK regions), and regarding erroneous regions (NG regions), estimated PSF data is sequentially stored in the memory as is, and regarding normal regions (OK regions), blur parameters including a peak coordinate position (a, b) and blur widths ($\sigma_x$ and $\sigma_y$) that approximate PSF data through a Gaussian function are stored in the memory.

Thus, by reducing a size of data to be stored in the memory, a size of the required memory may be reduced.

In one example, since different types of data for window regions are stored in the memory, a position coordinate value of a corresponding window region is stored together in the memory.

For example, among the 16×12 regions, (16, 1) is the far right upper end window region, and when this region is determined to be an erroneous region (NG region), an index value of (16, 1) is stored together with the PSF data in the memory. The stored position coordinate value is used for properly searching for the PSF data of the corresponding window region and performing correction thereon when a blurred captured image is corrected.

Furthermore, deblur parameters are also stored in the memory in addition to the PSF data for the erroneous regions (NG regions) and the blur parameters for the normal regions (OK regions).

For example, when a pixel region of an image sensor is divided into M×N window regions, the deblur parameters include the number of regions divided in a horizontal direction and the number of regions divided in a vertical direction. Also, when a horizontal directional size and a vertical directional size of each of the divided window regions are Sx and Sy, the deblur parameters include such size values.

In this manner, the PSF data, the blur parameters, and the deblur parameters stored in the memory are information regarding aberration characteristics of the corresponding camera module.

In the above example, it is described that data (for example, the PSF data, the blur parameters, and the deblur parameters) indicating a degree to which an image is blurred during a process in which light that has passed through the optical system is formed on the image sensor is stored in the memory, but deconvolution data modeled from the data indicating the degree to which the image is blurred may also be stored in the memory.

Figure 4:
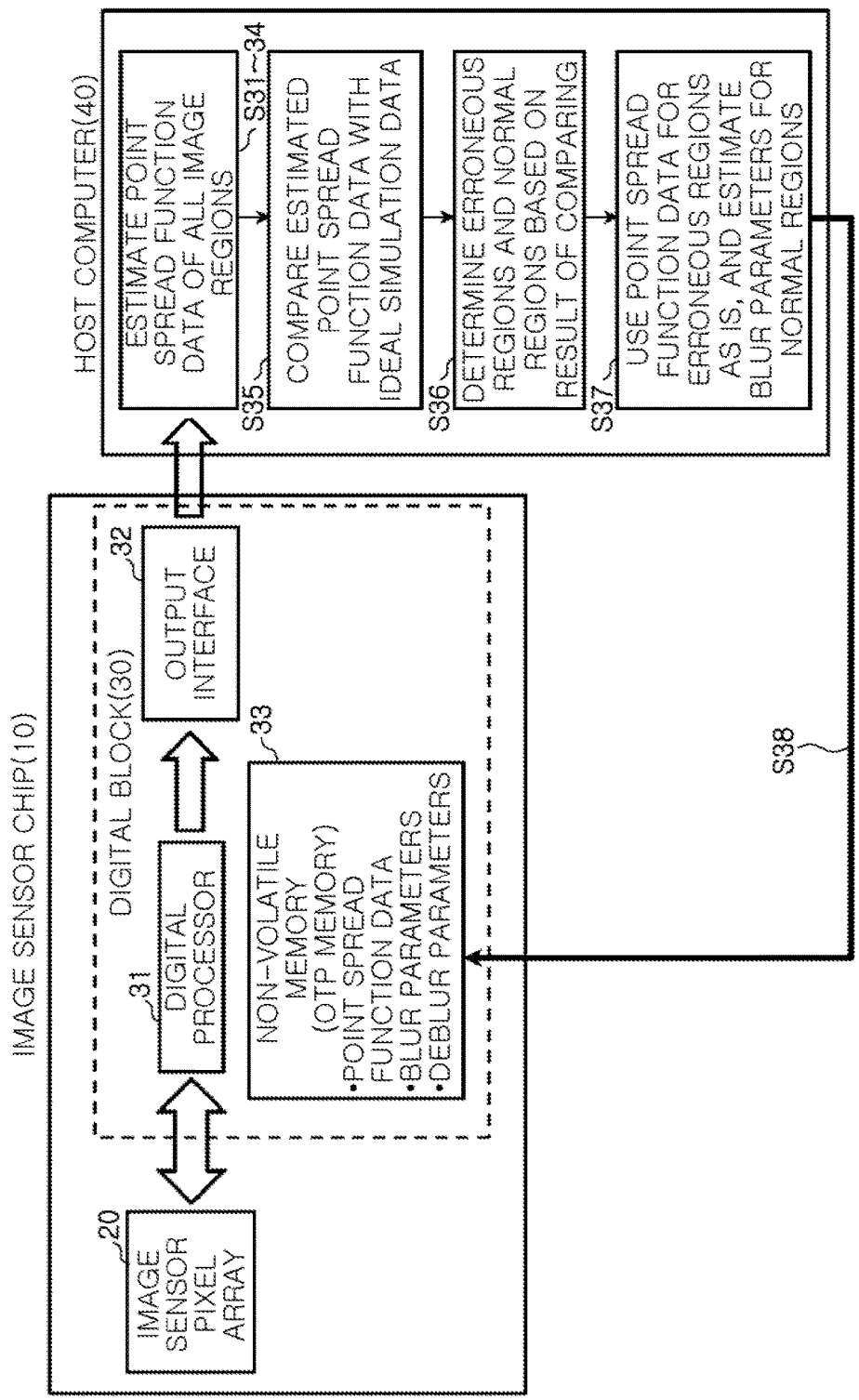
FIGS. 4 through 6 are block diagrams illustrating examples of a process of providing information regarding aberration characteristics to a camera module.
Figure 5:
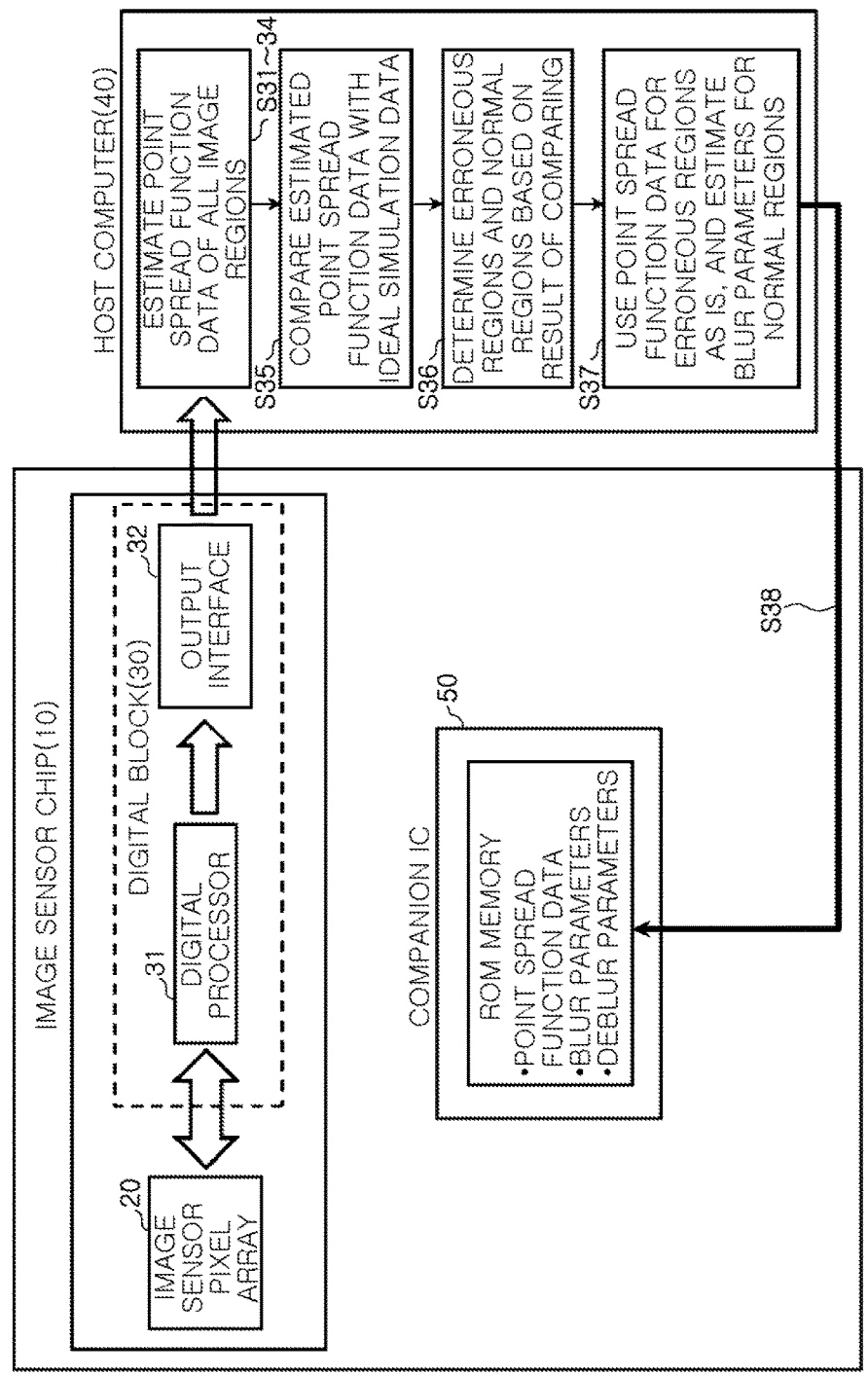
Figure 6:
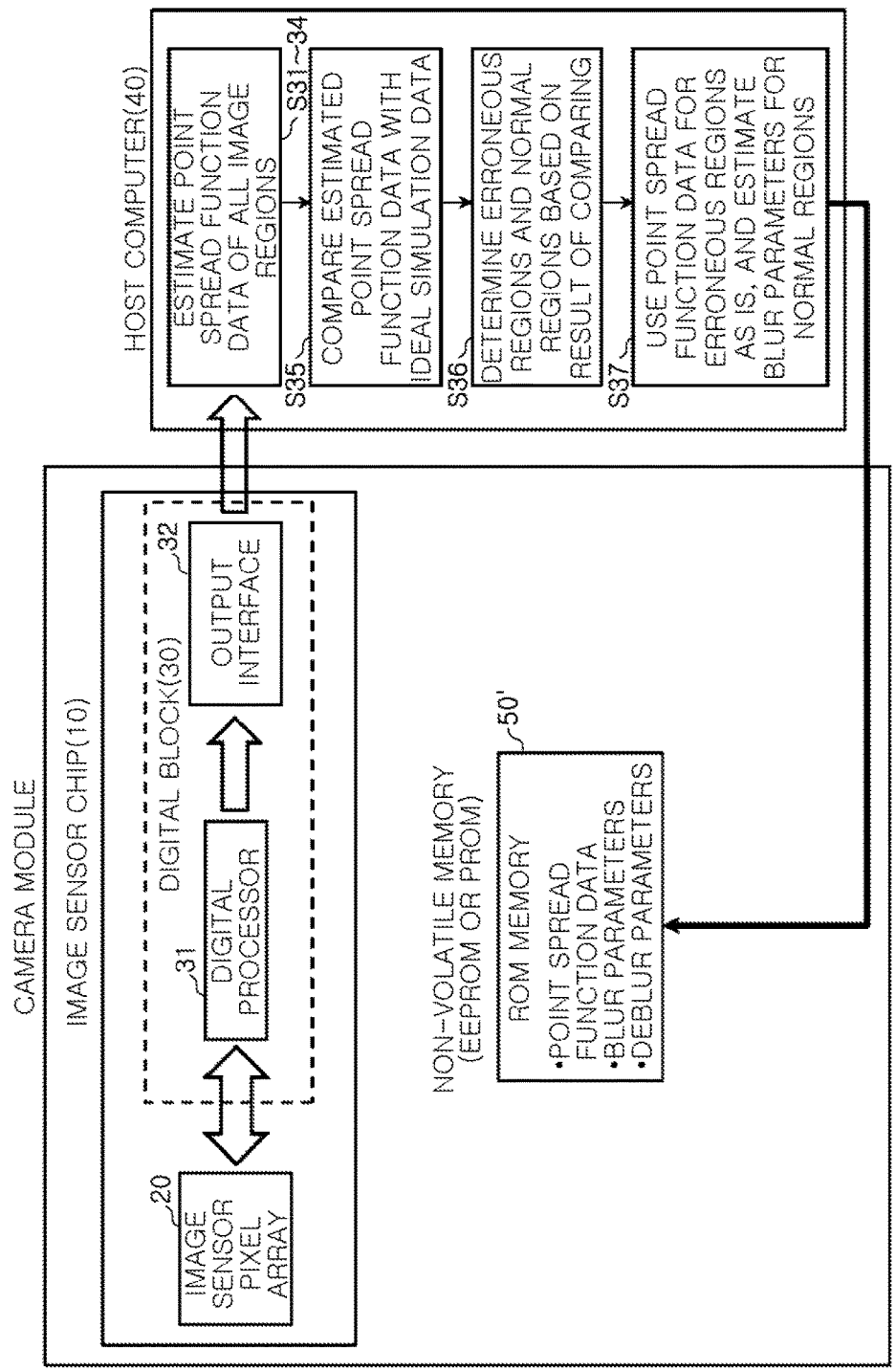

FIGS. 4 through 6 are block diagrams illustrating examples of a process of providing information regarding aberration characteristics to a camera module.

First, referring to FIG. 4, an unprocessed image (raw imaging data to which a correction algorithm has not been applied) captured through an image sensor pixel array 20 of an image sensor chip 10 is transferred to a host computer 40 through a digital processor 31 and an output interface 32, and an input image captured from a program of the host computer 40 is compared with an original chart image of a random noise pattern and interpreted to estimate PSF data of the camera module.

The PSF data of the camera module varies among manufactured camera modules, and thus PSF data of individual camera modules is estimated during calibration in a camera module manufacturing process and stored in a memory 33 of a corresponding camera module.

For example, referring to FIG. 4, the memory 33 may be a non-volatile memory (for example, a one-time programmable (OTP) memory) of the image sensor chip 10. The estimated PSF data may be stored in the form of a look-up table (LUT).

The process of estimating PSF data performed in the host computer 40 will be described.

First, a captured input image is divided into M×N window regions, and PSF data of all the window regions is estimated in operations S31 to S34, which are the same as operations S31 to S34 in FIG. 3.

For example, an original image of the chart is blurred using a PSF estimation function, and the captured input image data is compared with the blurred original image of the chart. PSF data is estimated by minimizing a difference between the captured input image data and the blurred original image of the chart by changing the PSF estimation function until a minimum difference is obtained.

When the PSF data of all of the M×N window regions is estimated, the estimated PSF data of the window regions is compared with ideal simulation data estimated from a design of the optical system in operation S35, which is the same as operation S35 in FIG. 3.

When a difference value between the estimated PSF data of a window region and the ideal simulation data is greater than a specific threshold value, the corresponding window region is determined to be an erroneous region (NG region) in terms of resolution of the camera module in operation S36, which is the same as operation S36 in FIG. 3.

Conversely, when the difference value is smaller than the specific threshold value, the estimated PSF data of the corresponding window region is not significantly different from the ideal simulation data, and thus the corresponding window region is determined to be a normal region (OK region) in terms of resolution of the camera module in operation S36, which is the same as operation S36 in FIG. 3.

The PSF data estimated for the erroneous regions (NG regions) is used as is, and the PSF data estimated for the normal regions (OK regions) is approximated by a Gaussian function to estimate blur parameters including blur widths and a peak coordinate position in operation S37, which is the same as operation S37 in FIG. 3.

The PSF data estimated for the erroneous regions (NG regions) is stored as is in the memory 33 of the camera module, and the blur parameters estimated for the normal regions (OK regions) are stored in the memory 33 of the camera module in operation S38, which is the same as operation S38 in FIG. 3.

In one example, since different types of data are stored for the window regions in the memory 33, a position coordinate value of the corresponding window region is stored together with the PSF data for the window region in the memory 33.

For example, among the 16×12 regions, (16, 1) is the far right upper end window region, and when this region is determined to be an erroneous region (NG region), an index value of (16, 1) is stored together with the PSF data for the erroneous region (NG region) in the memory 33. The stored position coordinate value is used for properly searching for the PSF data of the corresponding window region and performing correction thereon when a blurred captured image is corrected.

Furthermore, deblur parameters are stored in the memory 33 in addition to the PSF data for the erroneous regions (NG regions) and the blur parameters for the normal regions (OK regions).

For example, when a pixel region of an image sensor is divided into M×N window regions, the deblur parameters include the number of regions divided in a horizontal direction and the number of regions divided in a vertical direction. Also, when a horizontal directional size and a vertical directional size of each of the divided window regions are Sx and Sy, the deblur parameters include such size values.

In this manner, at least two types of information used for improving resolution of a captured unprocessed image (raw imaging data) are stored in the memory 33 of the camera module. Such information may be stored in the form of an LUT in the memory 33.

Referring to FIG. 4, the memory 33 is provided within the image sensor chip 10. For example, the memory 33 may be an OTP memory within the image sensor chip 10.

In one example, since different types of data are stored for the window regions of the unprocessed image (raw imaging data), a size of data stored in the memory 33 may be reduced.

Thus, since the size of the memory 33 itself is reduced, data for correcting resolution may be stored in the OTP memory provided within the image sensor chip 10. Thus, an increase in cost of the camera module may be reduced.

Referring to FIGS. 5 and 6, PSF data, blur parameters, and deblur parameters used for correcting resolution of an unprocessed image (raw imaging data) are stored in a separate companion integrated circuit (IC) 50 as shown in FIG. 5, or a non-volatile memory 50' as shown in FIG. 6, rather than in the OTP memory of the image sensor chip 10 as shown in FIG. 4.

For example, data for correcting resolution is stored in the companion IC 50 as shown in FIG. 5 or the non-volatile memory 50' in the form of an EEPROM or a PROM as shown in FIG. 6.

The companion IC 50 and the non-volatile memory 50' may be mounted on a board connected to the image sensor chip 10.

Figure 7:
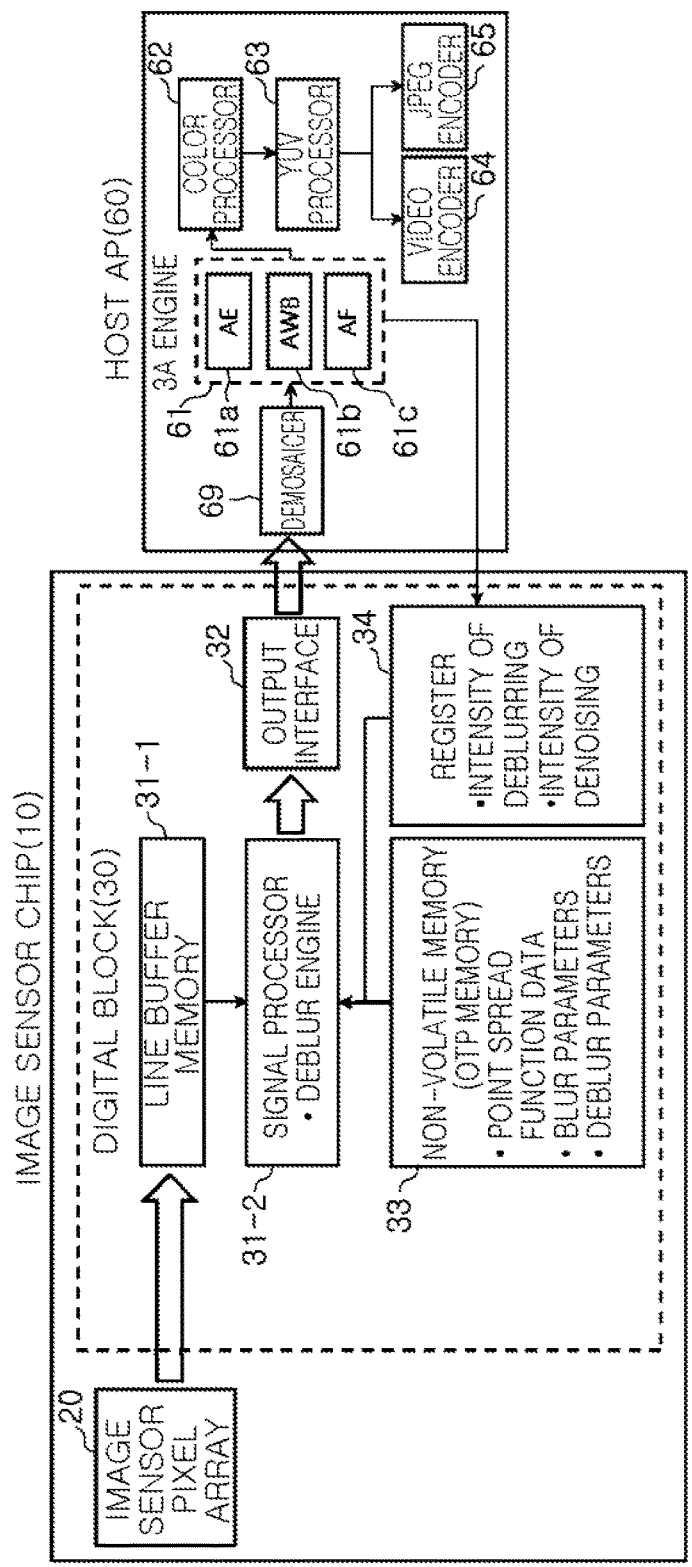
FIGS. 7 through 9 are block diagrams illustrating examples of a process in which a camera module corrects resolution.
Figure 8:
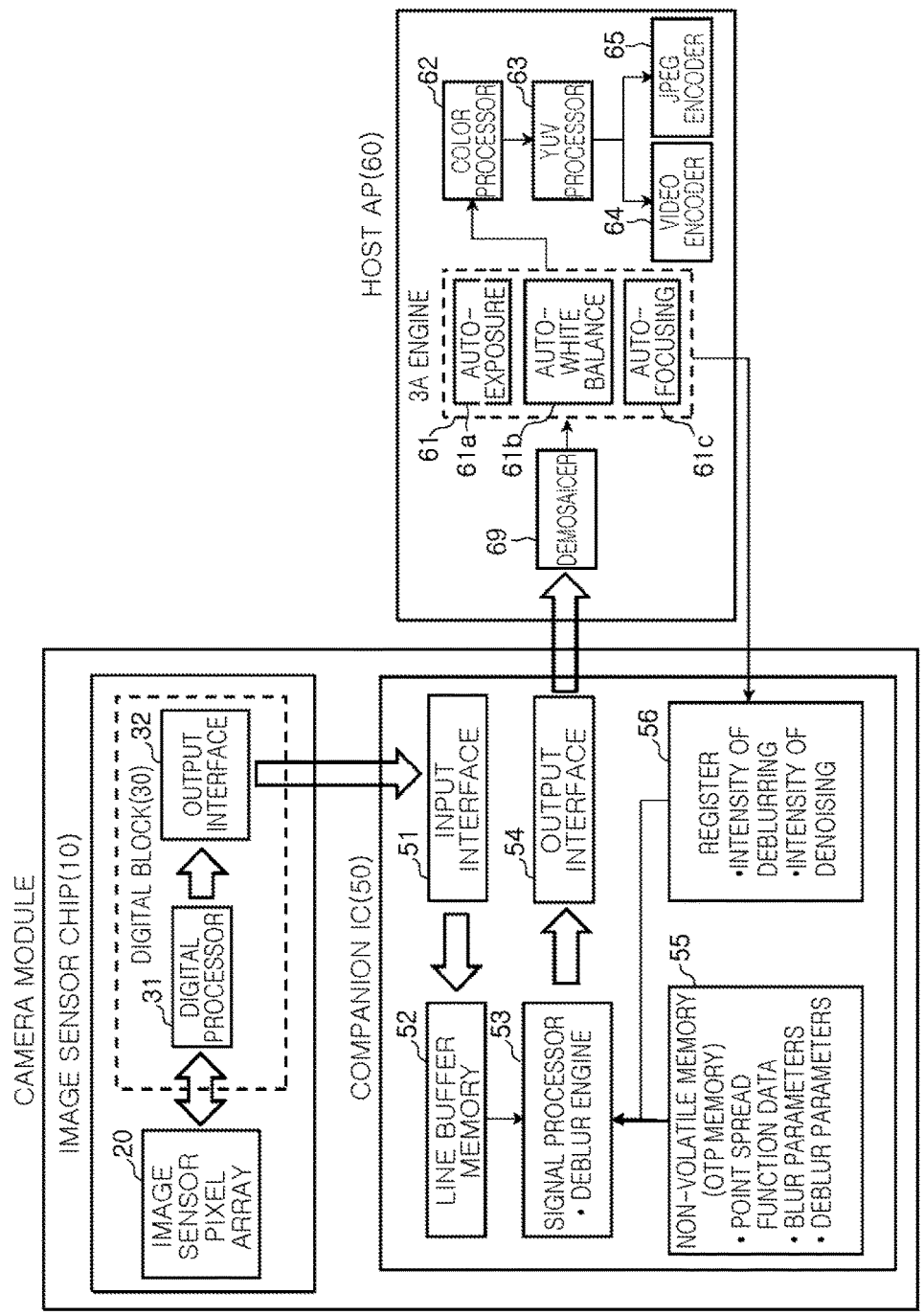
Figure 9:
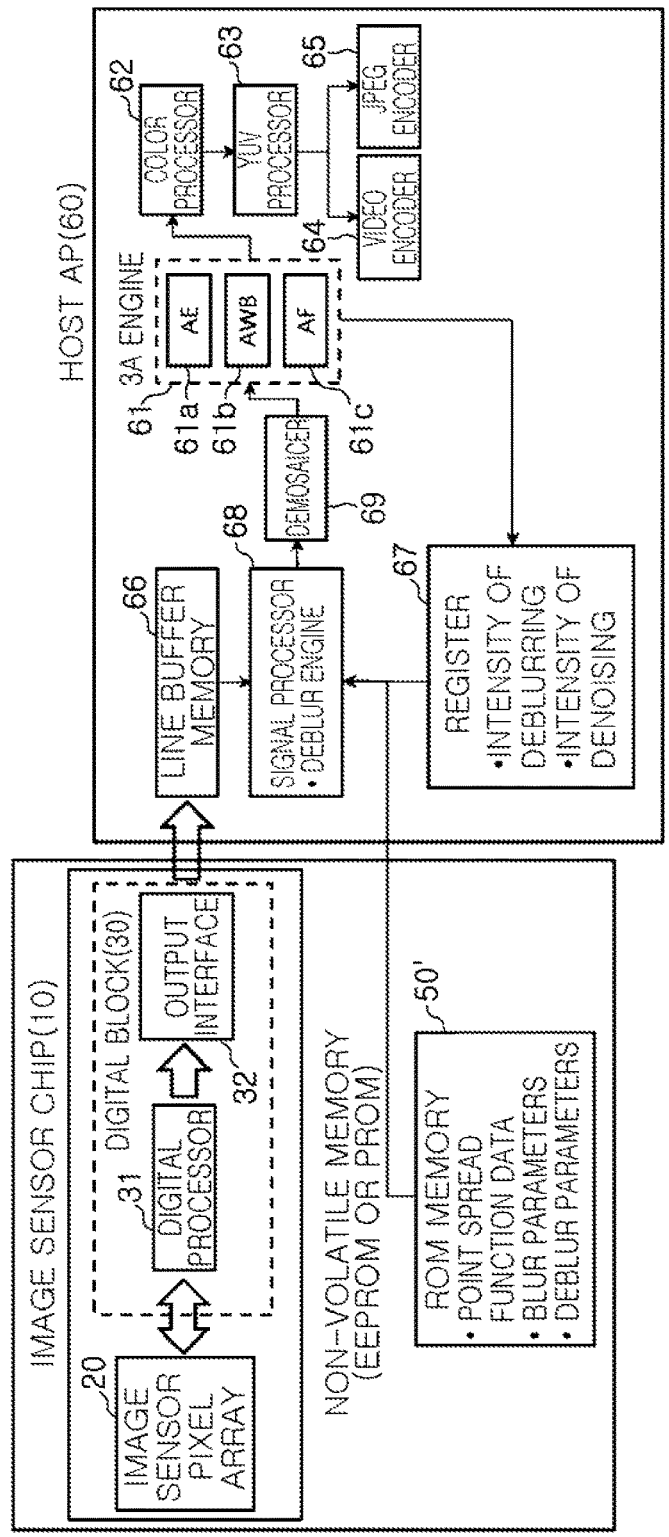

FIGS. 7 through 9 are block diagrams illustrating examples of a process in which a camera module corrects resolution.

First, referring to FIG. 7, the image sensor chip 10 of the camera module includes an image sensor pixel array 20 and a digital block 30.

The digital block 30 includes a temporary memory 31-1 (for example, a line buffer memory) that temporarily stores a captured unprocessed image (raw imaging data), the memory 33 storing information used for improving resolution, and a signal processor 31-2 for correcting resolution of the unprocessed image (raw imaging data).

The information used for improving resolution is information regarding aberration characteristics of the corresponding camera module.

The signal processor 31-2 includes a deblur engine for correcting resolution using the information stored in the memory 33, and the deblur engine performs a correction algorithm to read the information (for example, the PSF data, the blur parameters, and the deblur parameters) stored in the memory 33 and correct resolution using the read information.

The signal processor 31-2 including the deblur engine serves as a logic unit for improving the resolution of a captured image.

The image having the corrected resolution is transmitted to a host AP 60 of an external electronic device in which a camera module is installed through an output interface 32.

To process a corrected image, the host AP 60 includes a color processor 62, a YUV processor 63, a video encoder 64, and a JPEG encoder 65.

Resolution of the camera module is affected by an illumination environment when a subject is imaged and a determined focus adjustment position. Thus, in one example, a parameter for adjusting an intensity of deblurring to correct resolution and a parameter for adjusting an intensity of denoising according to the illumination environment and the determined focus adjustment position when imaging is performed may be further provided. A degree of improvement of resolution of the captured image may be determined using the parameters.

The host AP 60 of the external electronic device in which the camera module is installed further includes a demosaicer 69 and a 3A engine 61 including an auto-exposure (AE) engine 61*a*, an auto-white balance (AWB) engine 61*b*, and an auto-focus (AF) engine 61*c*.

When a subject is imaged, raw imaging data is demosaiced by the demosaicer 69, an illumination intensity is determined by the AE engine 61*a*, a color temperature value of a light source is determined by the AWB engine 61*b*, and a focus position of the optical system is determined by the AF engine 61*c*.

An appropriate intensity of deblurring and an appropriate intensity of denoising are determined from the determined intensity of illumination and stored as parameters in a register 34 of the image sensor chip 10.

Also, an appropriate intensity of deblurring and an appropriate intensity of denoising are determined from the determined color temperature value of the light source and stored as parameters in the register 34 of the image sensor chip 10. The parameter values may be stored in the register 34 separately provided in the camera module or stored in the memory 33 storing the information regarding aberration characteristics of the camera module.

Also, an appropriate intensity of deblurring and an appropriate intensity of denoising are determined from the determined focus position of the optical system and stored as parameters in the register 34 of the image sensor chip 10.

For simplicity, FIG. 7 shows one intensity of deblurring parameter and one intensity of denoising parameter stored in the register 34 of the image sensor chip 10. However, there are actually three intensity of deblurring parameters stored in the register 34, a first intensity of deblurring parameter determined from the illumination intensity, a second intensity of deblurring parameter determined from the color temperature, and a third intensity of deblurring parameter determined from the focus position. Likewise, there are actually three intensity of denoising parameters stored in the register 34, a first intensity of denoising parameter determined from the illumination intensity, a second intensity of denoising parameter determined from the color temperature, and a third intensity of denoising parameter determined from the focus position. However, in another example, a single intensity of deblurring parameter and a single intensity of denoising parameter may be determined from all three of the illumination intensity, the color temperature, and the focus position, and the single intensity of deblurring parameter and the single intensity of denoising parameter may be stored in the register 34 of the image sensor chip 10.

Furthermore, an intensity of deblurring and an intensity of denoising may be individually determined for each of a red channel, a green channel, and a blue channel.

The intensity of deblurring and the intensity of denoising may be prepared in the form of an LUT determined through experimentation in consideration of various illumination environments during the manufacturing process and while changing a distance to the subject.

For example, when an illumination environment and the focus position of the optical system are determined in the host AP 60, a corresponding intensity of deblurring and a corresponding intensity of denoising are selected with reference to the LUT, and when the selected values are stored in the register 34 of the image sensor chip 10, a signal processor of the image sensor chip 10 adjusts the intensity of deblurring and the intensity of denoising based on the register values.

For example, the intensity of deblurring may be divided into ten stages from 1 to 10. The first stage may be the weakest intensity of deblurring and the tenth stage may be the strongest intensity of deblurring. Similarly, the intensity of denoising may also be divided into ten stages from 1 to 10. However, the number of stages may be appropriately determined by experimentation, and may be more or less than ten stages.

Resolution correction data (for example, PSF data, blur parameters, and deblur parameters) stored in the memory 33 of the camera module may be determined in advance under a specific illumination condition and at a specific focus position during a manufacturing process of the camera module, and thus the resolution may not be sufficiently corrected for other illumination intensities, color temperatures of the light source, and focus positions of the optical system.

Thus, as described above, the resolution may be corrected in various environments by adjusting the intensity of deblurring and the intensity of denoising according to given illumination intensities, color temperatures of the light source, and focus positions.

For example, the intensity of deblurring may be set to be weak and the intensity of denoising may be set to be strong in a low illumination environment so that noise will be low. Also, in a case in which a focus position of the optical system is a close-up position, the intensity of deblurring may be set to be weak. Also, in a case in which the light source is halogen lighting (3000K) in which the intensity of red light is greater than the intensities of green light and blue light, the intensity of deblurring of a red channel may be set to be relatively strong compared to the intensities of deblurring of a green channel and a blue channel.

In this manner, resolution may be corrected in various environments by storing at least two types of information (for example, the PSF data, the blur parameters, the deblur parameters, the deblurring intensity parameter, and the denoising intensity parameter) in the camera module.

The deblur engine of the signal processor 31-2 may sample corresponding PSF data at a desired sampling rate and perform a blur correction calculation in a video mode. For example, it is assumed that PSF data predetermined and stored in the OTP memory is a value estimated on the basis of coordinates of a pixel array of the image sensor. In the case of an output of the pixel array of the image sensor in the video mode sampled two times horizontally and two times vertically, PSF data of the corresponding video mode may be obtained from PSF data obtained by sampling the PSF data read from the OTP memory by two times horizontally and two times vertically.

In this manner, the deblur engine may be performed in the video mode using the sampled PSF data in the same manner as in a still mode.

A process of correcting resolution by the camera module in a case in which information used for correcting resolution of an unprocessed image (raw imaging data) is stored in a separately provided companion IC 50 will be described with reference to FIG. 8.

First, an unprocessed image (raw imaging data) output from the image sensor pixel array 20 is transferred to the companion IC 50 through the digital processor 31 and the output interface 32.

Image data transferred from the image sensor chip 10 is received by an input interface 51 of the companion IC and is sequentially stored in the line buffer memory 52 of the companion IC 50 by a predetermined line number. When the image data by the predetermined line number is stored, a deblur engine installed in a signal processor 53 of the companion IC 50 operates.

The deblur engine of the signal processor 53 reads predetermined PSF data, blur parameters, and deblur parameters from a memory 55 of the companion IC 50 and performs a resolution correction algorithm.

Parameters specifying an intensity of deblurring and an intensity of denoising based on AE, AWB, and AF determined in the host AP 60 when imaging is performed as described above in connection with FIG. 7 are stored in a register 56 of the companion IC 50, and the deblur engine of the signal processor 53 corrects the resolution of an unprocessed image (raw imaging data) based on the register values.

The image having the corrected resolution is transmitted to the host AP 60 through an output interface 54 of the companion IC 50.

In this manner, by storing at least two types of information (for example, the PSF data, the blur parameters, the deblur parameters, the deblurring intensity parameter, and the denoising intensity parameter) for correcting resolution in the camera module, the resolution may be corrected in various environments.

A process of correcting resolution by the camera module in a case in which information used for correcting resolution of an unprocessed image (raw imaging data) is stored in the separately provided non-volatile memory 50' will be described with reference to FIG. 9.

In the example of FIG. 9, information used for correcting resolution is stored in the non-volatile memory 50' of the camera module, and a signal processor 68 for correcting resolution using the information is provided in the host AP 60.

First, an unprocessed image (raw imaging data) output from the pixel array 20 of the image sensor is transferred to the host AP 60 through the digital processor 31 and the output interface 32.

Image data transferred from the image sensor chip 10 is sequentially stored in a line buffer memory 66 of the host AP 60 by a predetermined line number. When the image data by the predetermined line number is stored, a deblur engine in the signal processor 68 of the host AP 60 operates.

The deblur engine of the signal processor 68 reads predetermined PSF data, blur parameters, and deblur parameters from the non-volatile memory 50' of the camera module and performs a resolution correction algorithm.

Parameters specifying an intensity of deblurring and an intensity of denoising based on AE, AWB, and AF determined in the host AP 60 when imaging is performed as described above in connection with FIG. 7 are stored in a register 67 of the host AP 60, and the deblur engine of the signal processor 68 corrects the resolution of an unprocessed image (raw imaging data) based on the register values.

In this manner, by storing at least two types of information (for example, the PSF data, the blur parameters, the deblur parameters, the deblurring intensity parameter, and the denoising intensity parameter) for correcting resolution in the camera module, the resolution may be corrected in various environments.

In these examples, information used for correcting resolution is individually determined for manufactured camera modules, and information customized for a corresponding camera module is stored in a memory of the corresponding camera module.

In the examples of FIGS. 7 and 8, the image having the corrected resolution is transferred to the host AP 60, whereas in the example of FIG. 9, the information (for example, the PSF data, the blur parameters, and the deblur parameters) used for correcting the resolution of the unprocessed image (raw imaging data) is transferred to the host AP 60.

In general, as the optical system is designed to be thinner, the resolution of the optical system is negatively affected.

However, as in the examples of FIGS. 7 through 9, in a case in which the information (for example, the PSF data, the blur parameters, the deblur parameters, the deblurring intensity parameter, and the denoising intensity parameter) regarding aberration characteristics customized for the corresponding camera module obtained during the process of manufacturing the camera module is stored in the camera module, even though the optical system is designed to be thinner, the resolution of a captured image may be corrected, and thus the requirement of both a slim camera module and a high resolution thereof may be satisfied.

Figure 10:
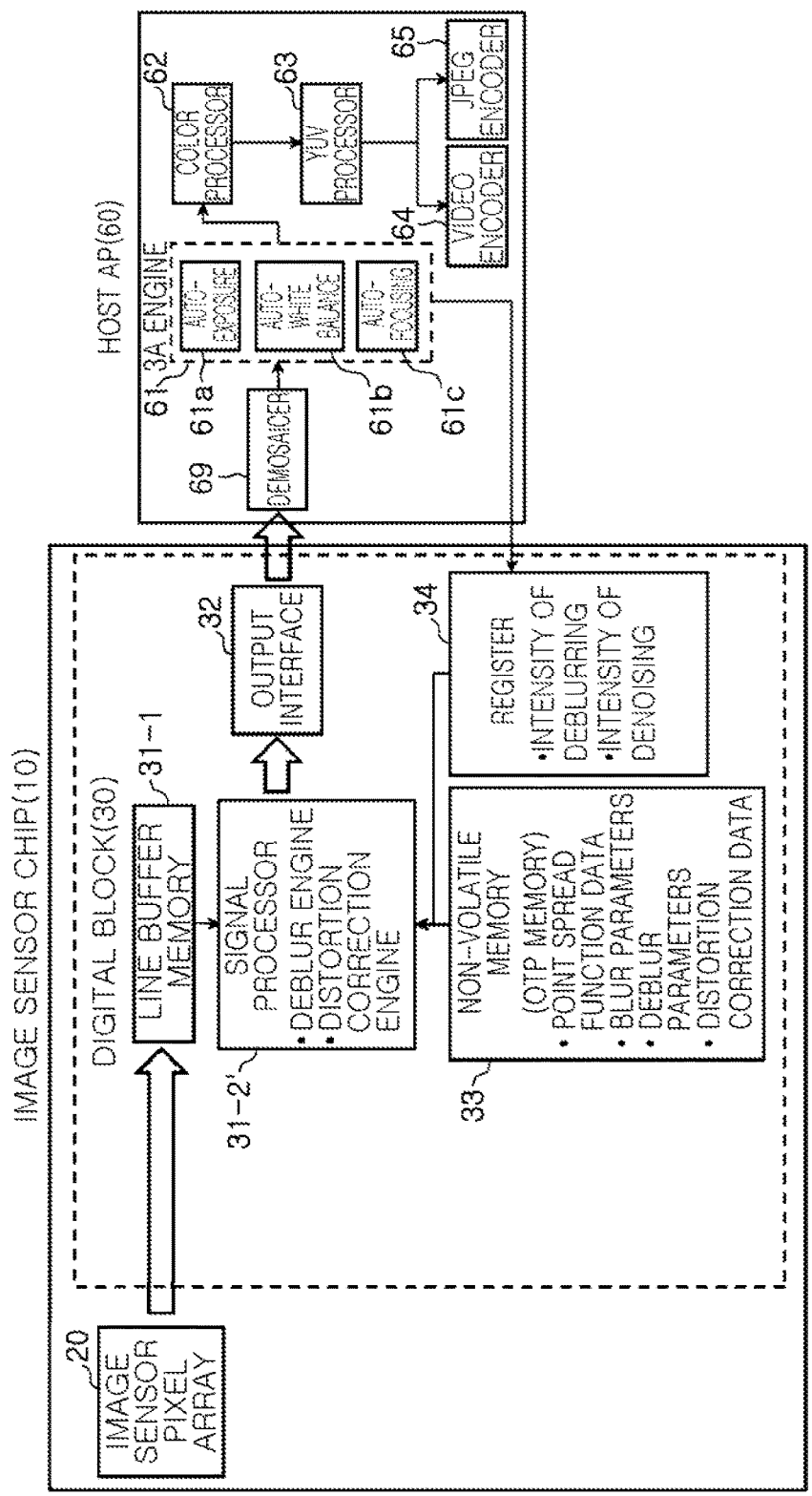
FIG. 10 is a block diagram illustrating an example of a process of additionally performing distortion correction in the example of FIG. 7.
Figure 11:
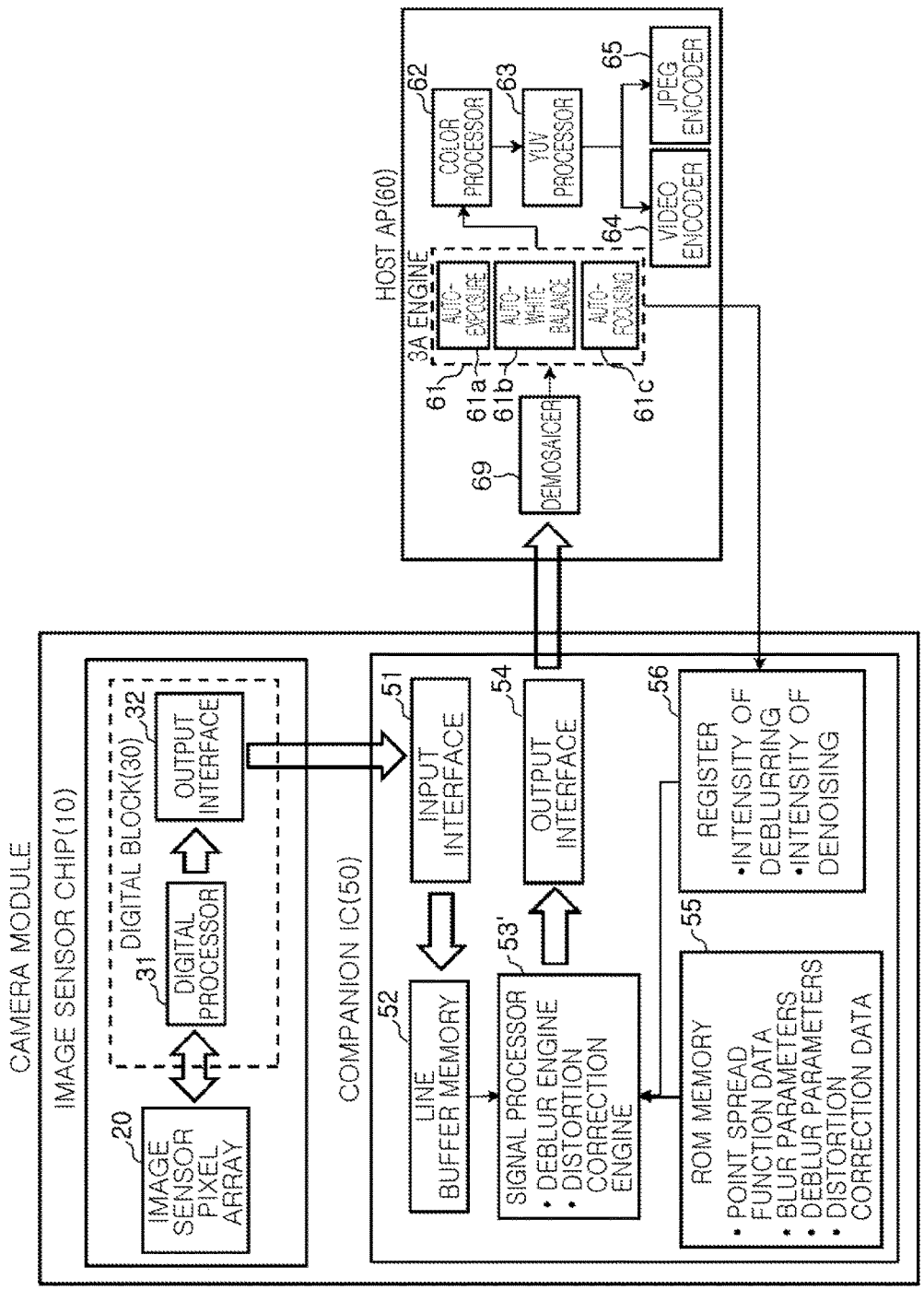
FIG. 11 is a block diagram illustrating an example of a process of additionally performing distortion correction in the example of FIG. 8.
Figure 12:
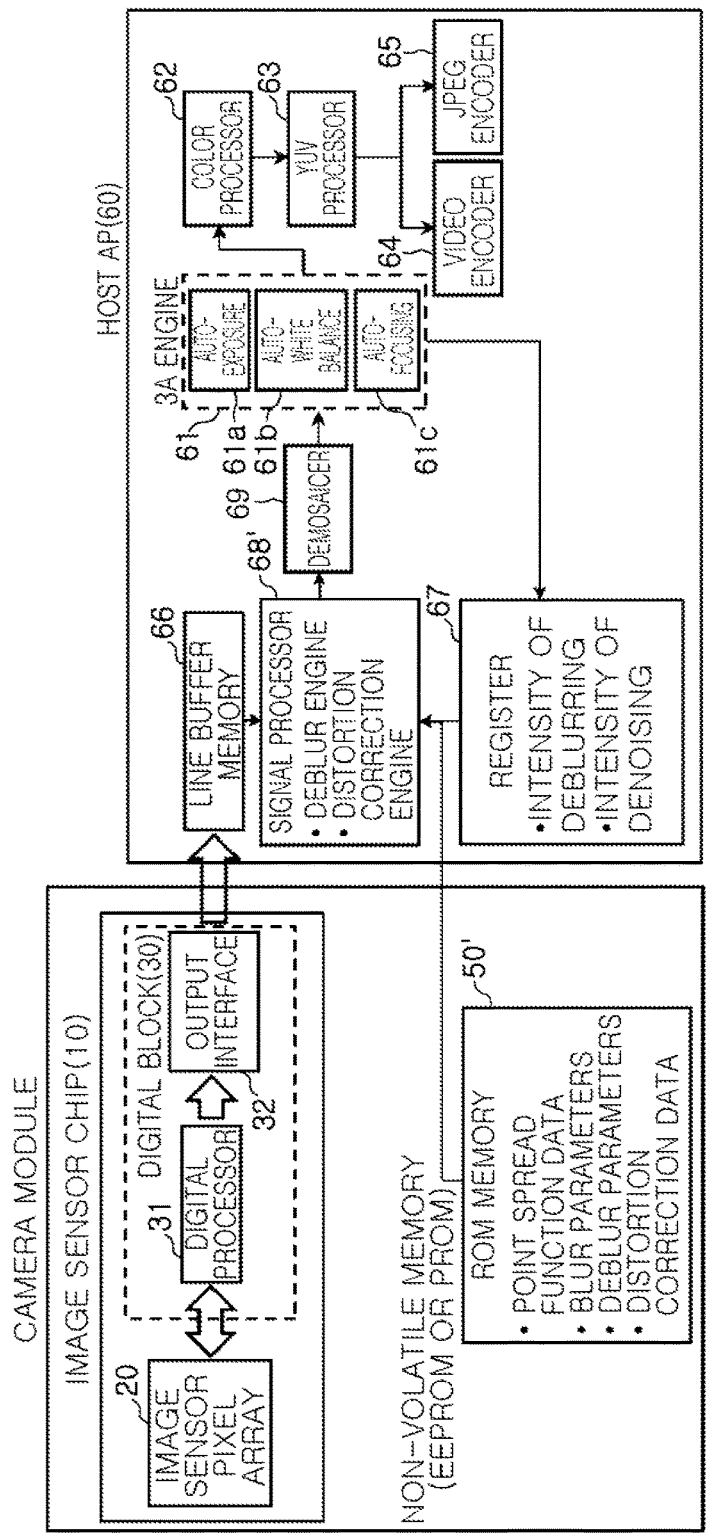
FIG. 12 is a block diagram illustrating an example of a process of additionally performing distortion correction in the example of FIG. 9.

FIG. 10 is a block diagram illustrating an example of a process of additionally performing distortion correction in the example of FIG. 7, FIG. 11 is a block diagram illustrating an example of a process of additionally performing distortion correction in the example of FIG. 8, and FIG. 12 is a block diagram illustrating an example of a process of additionally performing distortion correction in the example of FIG. 9.

In the examples of FIGS. 10 through 12, when the resolution is corrected, distortion is also corrected.

In general, when an optical system is designed to have a small amount of optical distortion, it is not easy to make the optical system thin.

However, in the examples of FIGS. 10 through 12, distortion correction is additionally performed when the resolution is corrected, so even though a large amount of optical distortion is allowed in designing an optical system, a corresponding distortion may be corrected, and thus a slim optical system may be designed. Thus, the requirement of both a slim camera module and a high resolution thereof may be satisfied.

In the examples of FIGS. 10 through 12, signal processors 31-2', 53', and 68' include both a deblur engine and a distortion correction engine. In the signal processors 31-2', 53', and 68', the deblur engine may operate first and then the distortion correction engine may operate, or conversely, the distortion correction engine may operate first and then the deblur engine may operate.

In the examples of FIGS. 10 through 12, distortion calibration data (data expressing an amount of distortion) is additionally stored in the OTP memory 33 as shown in FIG. 10, the companion IC 50 as shown in FIG. 11, and the non-volatile memory 50' as shown in FIG. 12 in which the information (for example, the PSF data, the blur parameters, and the deblur parameters) used for correcting the resolution is stored.

The distortion calibration data (the data expressing an amount of distortion) may be stored by regions of an image in an LUT, or a numerical expression expressing an amount of distortion according to regions of an image may be stored in an LUT.

Figure 13:
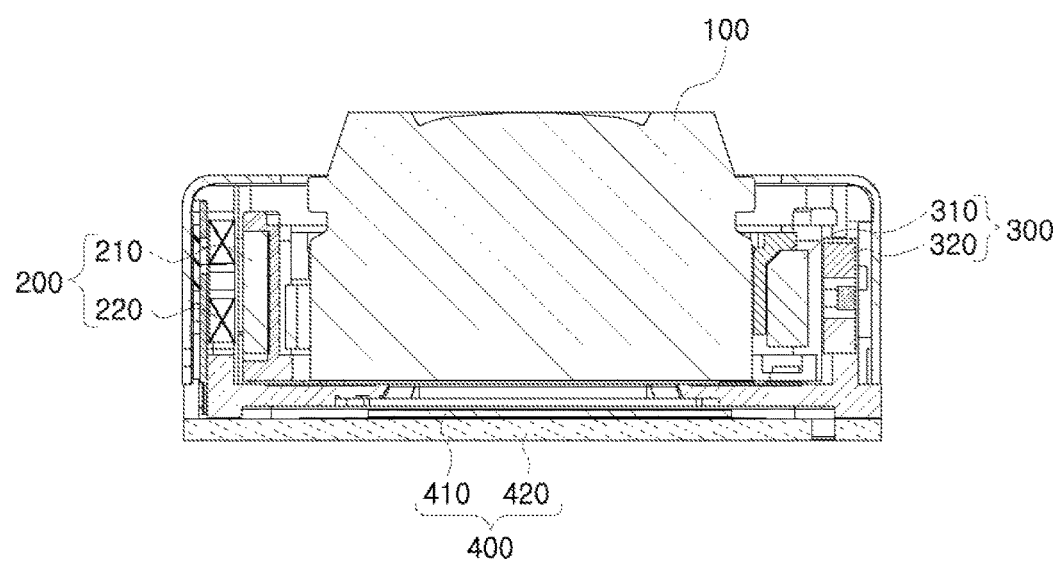
FIG. 13 is a cross-sectional view illustrating an example of a camera module in the examples of FIGS. 7 and 10.

FIG. 13 is a cross-sectional view illustrating an example of a camera module in the examples of FIGS. 7 and 10, and FIGS. 14 through 15B are views illustrating examples of a configuration of an image sensor in the camera module of FIG. 13.

First, referring to FIG. 13, a camera module includes a lens barrel 100 including an optical system having at least one lens, an AF actuator 200 including an AF magnet 210 and an AF coil 220 configured to move the lens barrel 100 in an optical axis direction, an optical image stabilizer (OIS) actuator 300 including an OIS magnet 310 and an OIS coil 320 configured to move the lens barrel 100 in a direction perpendicular to the optical axis, and an image sensor assembly 400 for generating an image of a subject.

In this example, defocusing may occur due to shaking of the user's hands in addition to errors in auto-focusing. Thus, the defocusing may be removed using information regarding aberration characteristics stored in a memory provided in the camera module as described above.

The image sensor assembly 400 includes an image sensor 410 for converting light that has passed through an optical system into an electrical signal, and a board 420 electrically connected to the image sensor 410.

Figure 14:
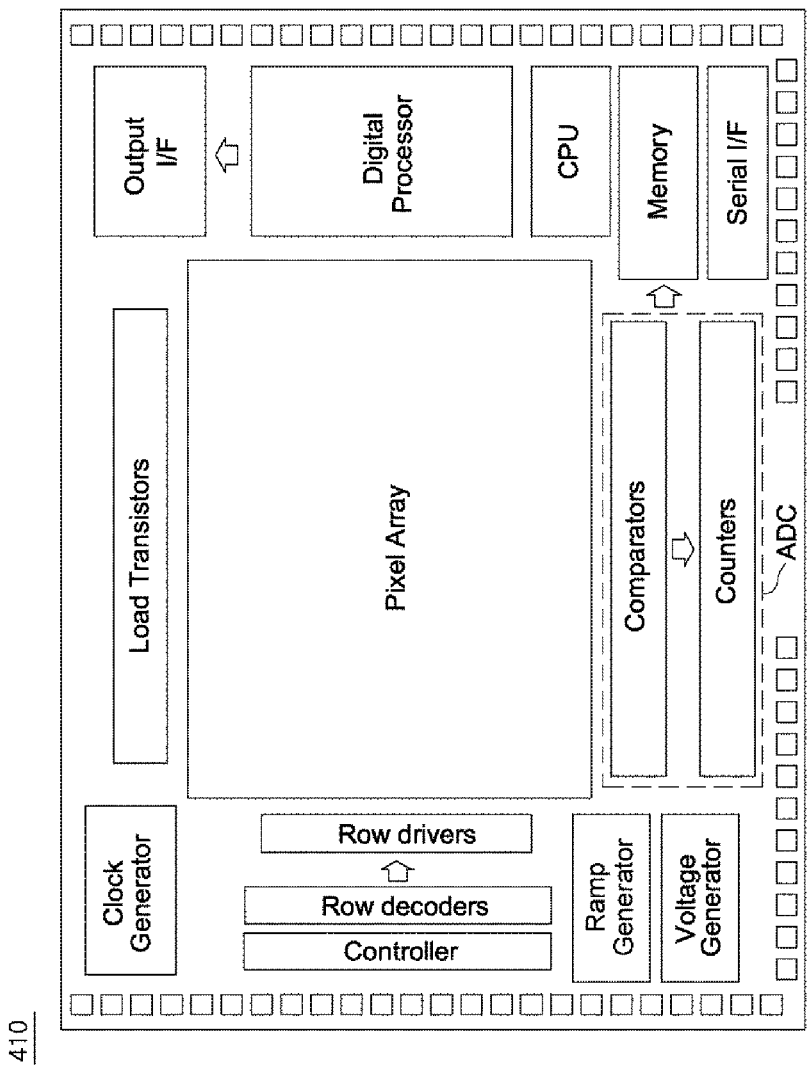

Referring to FIG. 14, the image sensor 410 in the camera module includes a pixel array including a plurality of image sensor pixels (not shown), an analog-to-digital converter (ADC) including comparators and counters for converting an output of the pixel array into a digital signal, a serial interface (I/F), a memory, a CPU, a digital processor, an output interface (I/F), a clock generator, a controller, row decoders, row drivers, load transistors, a ramp generator, a voltage generator, and pads for connecting the image sensor 410 to the board 420.

The pixel array may be a standard color pixel array of an RGB Bayer format of a red (R), green (G), and blue (B) combination, a color pixel array of a red (R), blue (B), and white (W) combination, or a non-standard color pixel array of an R, G, B, and W combination. In another example, the pixel array may be configured as a mono color pixel array in a black-and-white form.

The memory includes a ROM memory having firmware for driving a sensor, a RAM memory serving as a data buffer during a digital image processing operation, and an OTP memory storing information (for example, PSF data, blur parameters, and deblur parameters) used for correcting resolution.

The digital processor to the right of the pixel array includes a signal processor including either a deblur engine or both a deblur engine and a distortion correction engine.

An image signal that has been digitally converted by the ADC undergoes image processing (for example, resolution correction or both resolution correction and distortion correction) in the digital processor to the right of the pixel array, and is subsequently transmitted to the host AP through the output interface (I/F).

Another example of an image sensor will be described with reference to FIGS. 15A and 15B.

Figure 15B:
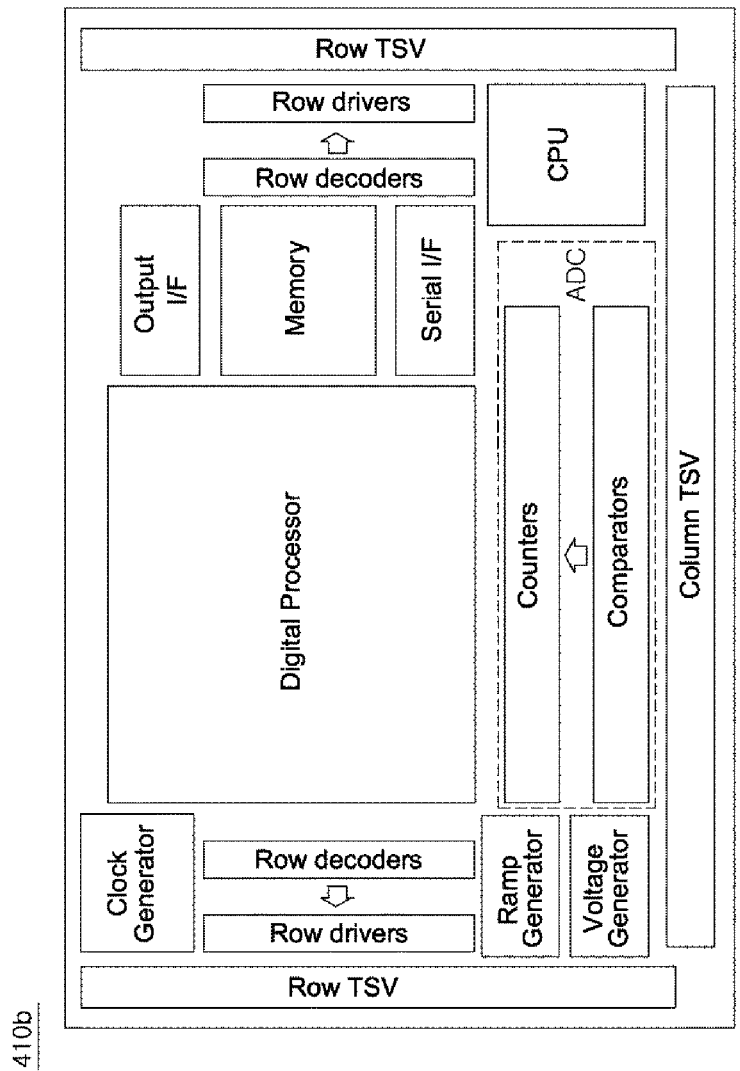

In the example of FIGS. 15A and 15B, the image sensor includes a first layer 410a including a pixel array including a plurality of image sensor pixels (not shown), and load transistors, and a second layer 410b including an ADC including comparators and counters, a digital processor, a CPU, a serial interface (I/F), a memory, an output interface (I/F), a clock generator, two sets of row decoders, two sets of row drivers, a ramp generator, and a voltage processor. The first layer 410a and the second layer 410b also include row through-silicon vias (TSV) and column through-silicon vias (TSV) connecting the first layer 410a and the second layer 410b together. The first layer 410a also includes pads for connecting the first layer 410a of the image sensor to the board 420. Since the image sensor is configured as two layers 410a and 410b, an overall area of the image sensor may be reduced.

Figure 16:
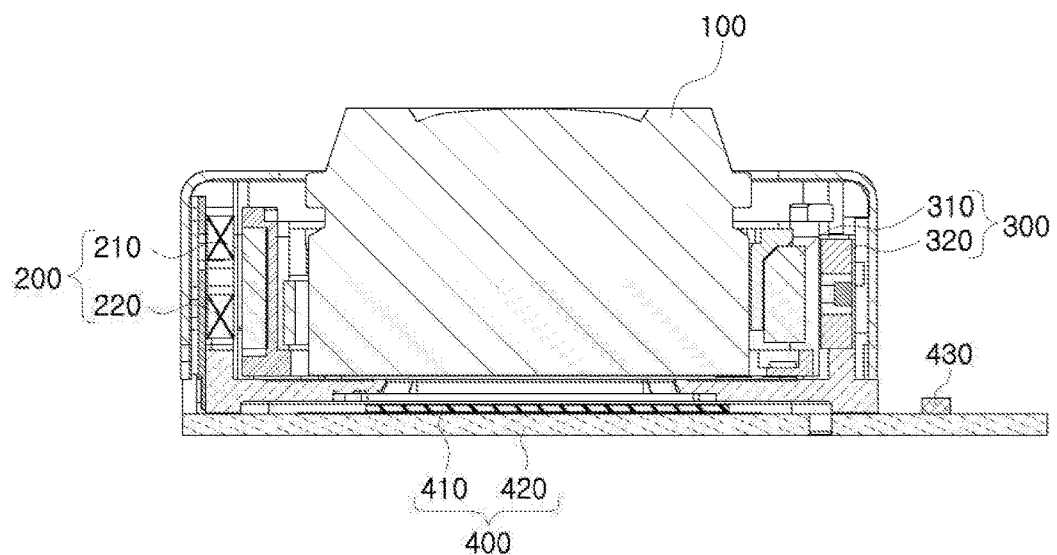
FIG. 16 is a cross-sectional view of an example of a camera module in the examples of FIGS. 8 and 11.
Figure 17:
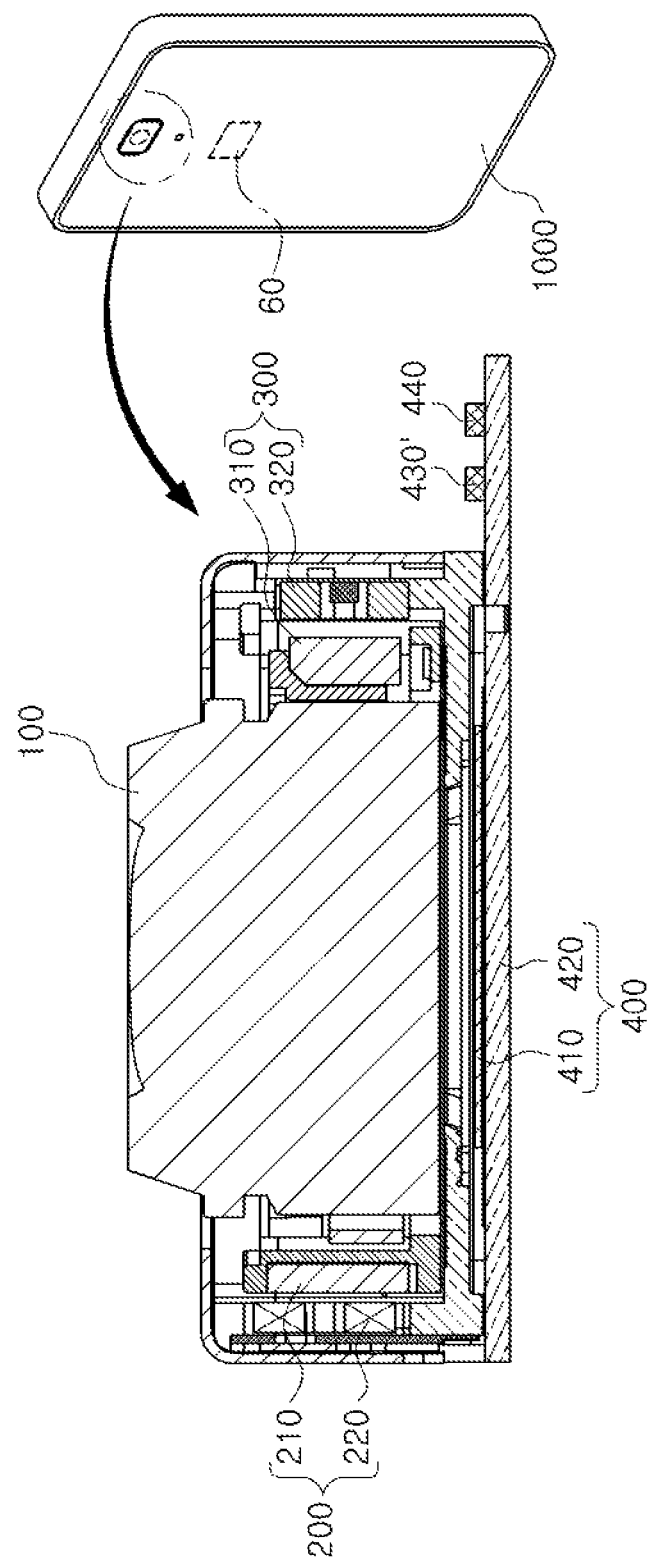
FIG. 17 is a cross-sectional view of an example of a camera module in the example of FIGS. 9 and 12.

FIG. 16 is a cross-sectional view of an example of a camera module in the examples of FIGS. 8 and 11, and FIG. 17 is a cross-sectional view of an example of a camera module in the examples of FIGS. 9 and 12.

In the example of FIG. 16, information used for correcting resolution and a signal processor for processing an image (for example, for performing resolution correction) using the information are provided in a separate companion IC 430.

In an example of FIG. 17, information used for correcting resolution is stored in a separate non-volatile memory 430', and a signal processor for processing an image (for example, for performing resolution correction) using the information is provided in the host AP 60.

In FIG. 17, reference numeral 440 denotes a connector for connecting the camera module to an external electronic device 1000 including the host AP 60.

In the examples of FIGS. 13, 16, and 17, since the information (for example, PSF data, blur parameters, and deblur parameters) used for correcting resolution is provided in the camera module itself, a requirement of both a slim configuration and a high resolution may be satisfied.

The example described above enable an optical system to satisfy TTL/IMGH<1 while achieving a high resolution. TTL denotes a distance from an object side surface of a lens closest to a subject to an image formation surface of an image sensor, and IMGH denotes a diagonal length of a pixel array of the image sensor.

When an optical system is designed, even though the optical system may be designed to be thin by satisfying TTL/IMGH<1, a resultant degradation of the resolution may be compensated by a resolution correction algorithm, and thus the requirement of both a slim configuration and a high resolution may be satisfied.

For example, the optical system may be designed to satisfy TTL/IMGH≤0.75 or TTL/IMGH≤0.7.

The information used for correcting resolution is individually determined according to characteristics of each camera module, and thus a resolution correction algorithm customized for each manufactured camera module can be applied.

As described above, the camera module and the method of manufacturing the same according to the examples described above improve the resolution of a captured image, and enable a thinner camera module with a high resolution to be manufactured.

The image sensor chip 10, the image sensor pixel array 20, the digital block 30, the digital processor 31, the output interface 32, and the host computer 40 in FIGS. 4-6, the memory 33 in FIG. 4, the companion IC 50 in FIG. 5, the non-volatile memory 50' in FIG. 6, the image sensor chip 10, the image sensor pixel array 20, the digital block 30, the line buffer memory 31-1, the signal processor 31-2, the output interface 32, the memory 33, the register 34, and the host AP 60 in FIG. 7, the demosaicer 69, the 3A engine 61, the auto-exposure (AE) engine 61a, the auto-white balance (AWB) engine 61b, the auto-focus (AF) engine 61c, the color processor 62, the YUV processor 63, the video encoder 64, and the JPEG encoder 65 in FIGS. 7-12, the image sensor chip 10, the image sensor pixel array 20, the digital block 30, the digital processor 31, the output interface 32, the companion IC 50, the input interface 51, the line buffer memory 52, the signal processor 53, the output interface 54, the non-volatile memory 55, the register 56, and the host AP 60 in FIG. 8, the image sensor chip 10, the image sensor pixel array 20, the digital block 30, the digital processor 31, the output interface 32, the non-volatile memory 50', the host AP 60, the line buffer memory 66, the register 67, and the signal processor 68 in FIG. 9, the image sensor chip 10, the image sensor pixel array 20, the digital block 30, the line buffer memory 31-1, the signal processor 31-2', the output interface 32, the memory 33, the register 34, and the host AP 60 in FIG. 10, the image sensor chip 10, the image sensor pixel array 20, the digital block 30, the digital processor 31, the output interface 32, the companion IC 50, the input interface 51, the line buffer memory 52, the signal processor 53', the output interface 54, the non-volatile memory 55, the register 56, and the host AP 60 in FIG. 11, the image sensor chip 10, the image sensor pixel array 20, the digital block 30, the digital processor 31, the output interface 32, the non-volatile memory 50', the host AP 60, the line buffer memory 66, the register 67, and the signal processor 68' in FIG. 12, the image sensor assembly 400, the image sensor 410, and the board 420 in FIGS. 13, 16, and 17, the image sensor 410, the pixel array, the image sensor pixels (not shown), the analog-to-digital converter (ADC), the comparators, the counters, the serial interface (I/F), the memory, the CPU, the digital processor to the right of the pixel array, the output interface (I/F), the clock generator, the controller, the row decoders, the row drivers, the load transistors, the other digital processor to the left of the pixel array, and the voltage generator in FIG. 14, the layer 410a, the pixel array, and the image sensor pixels (not shown) in FIG. 15A, the second layer 410b, the ADC, the comparators, the counters, the digital processor, the CPU, the serial interface (I/F), the memory, the output interface (I/F), the clock generator, the controller, the row decoders, the row drivers, the load transistors, the ramp generator, and the voltage processor in FIG. 15B, the companion IC 430 in FIG. 16, and the non-volatile memory 430', the host AP 60, and the external electronic device 1000 in FIG. 16 that perform the operations described herein with respect to FIGS. 1-17 are implemented by hardware components. Examples of hardware components include controllers, sensors, generators, drivers, memories, comparators, arithmetic logic units, adders, subtractors, multipliers, dividers, integrators, photodiodes, samplers, amplifiers, analog-to-digital converters, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-17. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 and 3-6 that perform the operations described herein with respect to FIGS. 1-17 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module having an image sensor and an optical system having at least one lens, the camera module comprising:
   a memory storing information regarding aberration characteristics of the camera module affecting a resolution of the camera module;
   wherein the information regarding aberration characteristics comprises information estimated in advance by comparing an image generated by the camera module with a reference image,
   wherein the information regarding aberration characteristics comprises aberration information of a plurality of regions of the image estimated according to different schemes, and
   wherein the aberration information comprises aberration information of some regions of the plurality of regions of the image estimated according to a first scheme, and aberration information of remaining regions of the plurality of regions of the image estimated according to a second scheme; and
   a total data size of the aberration information estimated according to the first scheme and a total data size of the aberration information estimated according to the second scheme are different from each other.

2. The camera module of claim 1, wherein the information regarding aberration characteristics comprises data expressing an image blur generated when light passing through the optical system forms an image on the image sensor.

3. The camera module of claim 1, wherein the aberration information estimated according to the first scheme comprises point spread function data expressing an image blur generated when light passing through the optical system forms an image on the image sensor.

4. The camera module of claim 1, wherein the aberration information estimated according to the second scheme comprises blur parameters comprising a peak coordinate position and a blur width extracted from point spread function data expressing an image blur generated when light passing through the optical system forms an image on the image sensor.

5. The camera module of claim 1, wherein the information regarding aberration characteristics comprises information regarding an amount of distortion of the image captured by the camera module.

6. A camera module comprising:
   an image sensor;
   an optical system configured to form an image on the image sensor; and
   a memory storing information for correcting a resolution of the camera module, the information being specific to the camera module and having been customized for the camera module during manufacture of the camera module,
   where the information for correcting the resolution comprises:
   a first type of information for first regions of the image sensor in which the resolution of the camera module is lower than a predetermined threshold value; and
   a second type of information for second regions of the image sensor in which the resolution of the camera module is higher than the predetermined threshold value.

7. The camera module of claim 1, wherein the memory further stores a parameter determining a degree of improvement of resolution of the image captured by the camera module according to either one or both of an illumination environment and a focus position when the image is captured.

8. The camera module of claim 1, further comprising a signal processor configured to improve a resolution of an image captured by the camera module using the information regarding aberration characteristics.

9. The camera module of claim 1, wherein TTL/IMGH<1, where TTL is a distance from an object side surface of a lens of the optical system closest to a subject to an image formation surface of the image sensor, and IMGH is a diagonal length of a pixel array of the image sensor.

10. The camera module of claim 9, wherein TTL/IMGH≤0.75 or TTL/IMGH≤0.7.

11. The camera module of claim 1, wherein the information regarding aberration characteristics comprises information estimated according to individual characteristics of the camera module during a process of manufacturing the camera module.

12. A camera module comprising:
   an optical system comprising at least one lens;
   an image sensor configured to generate an image in response to receiving light passing through the optical system;
   a memory storing information regarding aberration characteristics of the optical system and the image sensor, the information regarding aberration characteristics comprising data indicating a degree to which the image is blurred; and
   a signal processor configured to perform image processing of the image to improve a resolution of the image using the information regarding aberration characteristics, and provide the processed image to an external electronic device,
   wherein the information regarding aberration characteristics comprises aberration information of some regions of a plurality of regions of the image estimated according to a first scheme, and aberration information of remaining regions of the plurality of regions of the image estimated according to a scheme; and a total data size of the aberration information estimated according to the first scheme and a total data size of the aberration information estimated according to the second scheme are different from each other.

13. A camera module for generating an image with an image sensor and an optical system having at least one lens, the camera module comprising:

a memory storing information regarding aberration characteristics of the optical system and the image sensor, the information regarding aberration characteristics comprising data indicating a degree to which the image is blurred;

wherein the camera module is configured to provide the image generated by the optical system and the image sensor and the information regarding aberration characteristics to an external electronic device, wherein the information regarding aberration characteristics comprises aberration information of some regions of a plurality of regions of the image estimated according to a first scheme, and aberration information of remaining regions of the plurality of regions of the image estimated according to a second scheme; and a total data size of the aberration information estimated according to the first scheme and a total data size of the aberration information estimated according to the second scheme are different from each other.

14. A method of manufacturing a camera module for generating an image with an image sensor and an optical system having at least one lens, the method comprising:

estimating information regarding aberration characteristics of an image generated by an individual camera module; and storing the estimated information in a memory of the individual camera module, wherein the information regarding aberration characteristics comprises aberration information of some regions of a plurality of regions of the image estimated according to a first scheme, and aberration information of remaining regions of the plurality of regions of the image estimated according to a second scheme; and a total data size of the aberration information estimated according to the first scheme and a total data size of the aberration information estimated according to the second scheme are different from each other.

15. The camera module of claim 6, wherein the first type of information comprises point spread function data estimated for the first regions of the image sensor; and the second type of information comprises blur parameters estimated from a function approximating point spread function data estimated for the second regions of the image sensor.

16. The camera module of claim 6, wherein the memory further stores information for correcting a distortion of an image generated by the image sensor caused by an optical distortion of the optical system.

* * * * *